(12) United States Patent
Takeuchi et al.

(10) Patent No.: US 11,796,745 B2
(45) Date of Patent: Oct. 24, 2023

(54) CABLE ANCHORING

(71) Applicant: Go!Foton Holdings, Inc., Somerset, NJ (US)

(72) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 0 days.

(21) Appl. No.: 17/153,364

(22) Filed: Jan. 20, 2021

(65) Prior Publication Data

US 2021/0223481 A1  Jul. 22, 2021

Related U.S. Application Data

(60) Provisional application No. 62/964,357, filed on Jan. 22, 2020.

(51) Int. Cl.
  *G02B 6/38* (2006.01)
  *G02B 6/44* (2006.01)

(52) U.S. Cl.
  CPC ......... *G02B 6/3887* (2013.01); *G02B 6/3888* (2021.05); *G02B 6/4471* (2013.01); *G02B 6/3857* (2013.01); *G02B 6/4469* (2013.01)

(58) Field of Classification Search
  None
  See application file for complete search history.

(56) References Cited

U.S. PATENT DOCUMENTS

| 4,133,601 A | * | 1/1979 | Le Guen | G02B 6/403 |
| | | | | 385/80 |
| 5,835,658 A | | 11/1998 | Smith | |
| 2009/0052845 A1 | * | 2/2009 | Oi | G02B 6/3887 |
| | | | | 385/87 |

* cited by examiner

*Primary Examiner* — Michelle R Connelly
(74) *Attorney, Agent, or Firm* — Lerner David LLP

(57) ABSTRACT

A system including a sheath having a first end and a second end, at least one elongated member positioned within the sheath, the at least one elongated member extending at least between the first and the second end of the sheath, an anchor configured to be secured to the sheath, the anchor having a first dimension, and a stopper wall comprising an opening having an opening dimension, the opening dimension being smaller than the first dimension, wherein the opening is configured to receive the sheath when the anchor is secured to the at least one end of the sheath.

19 Claims, 21 Drawing Sheets

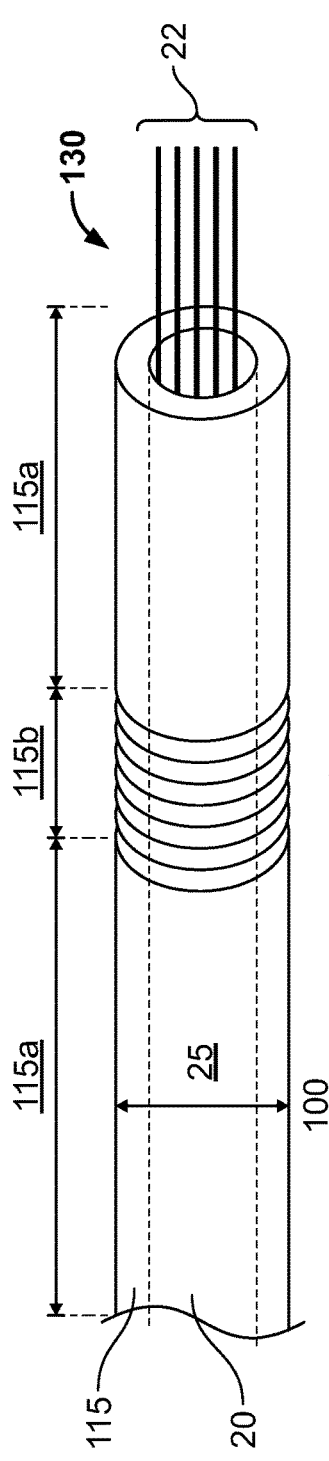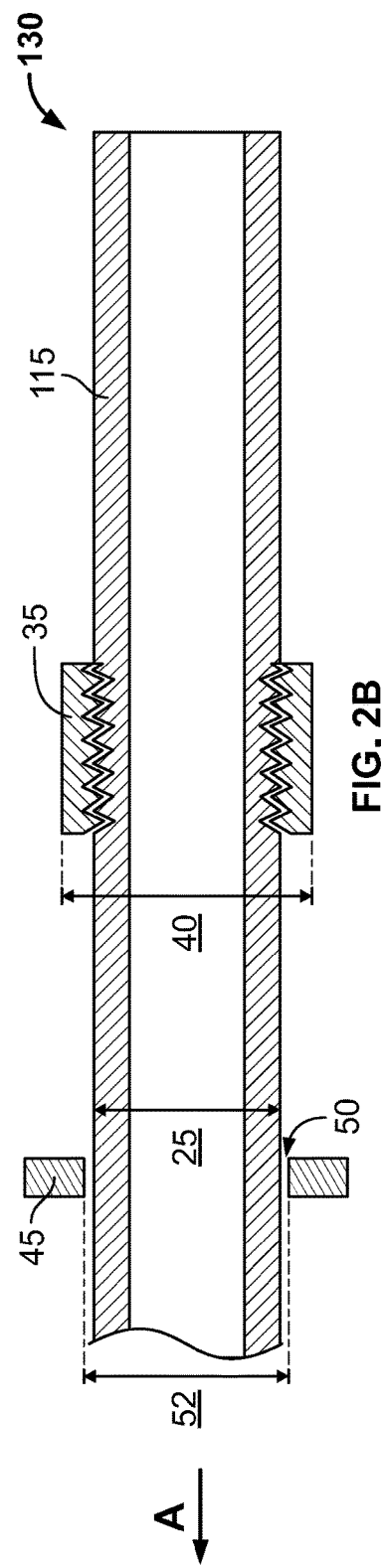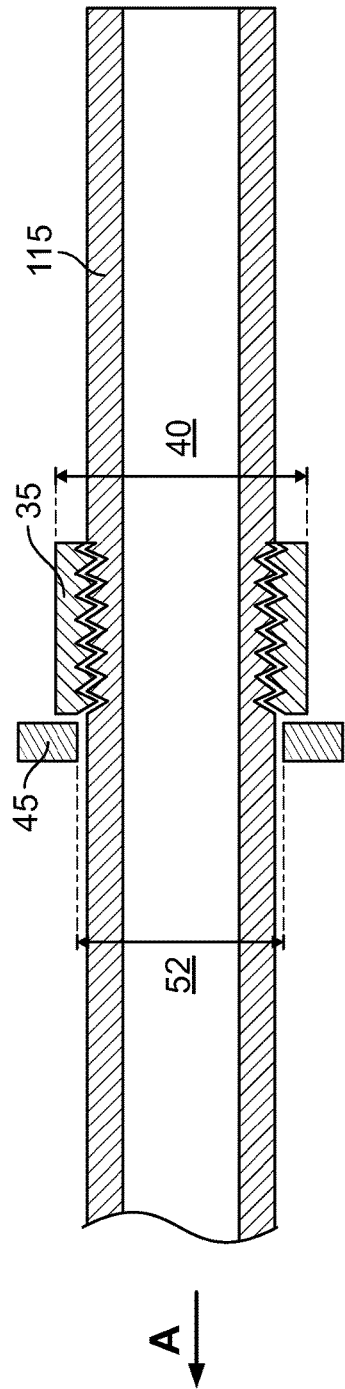

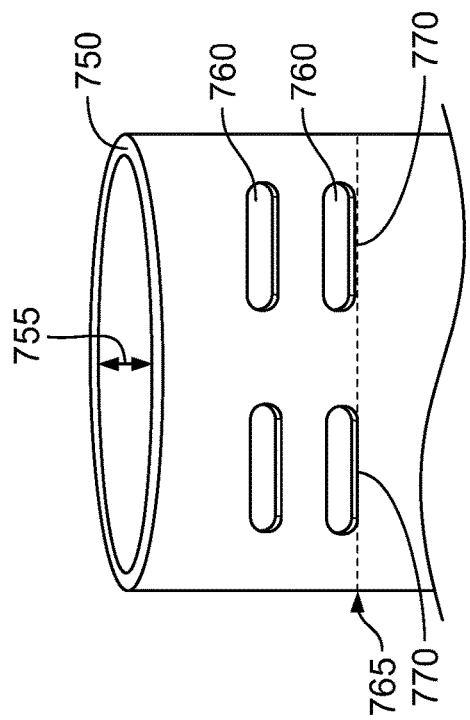
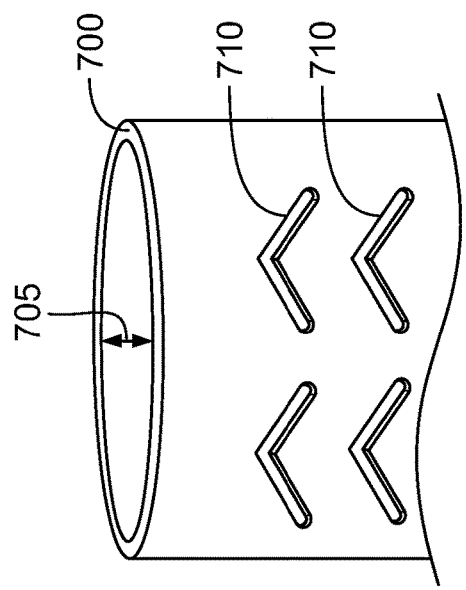
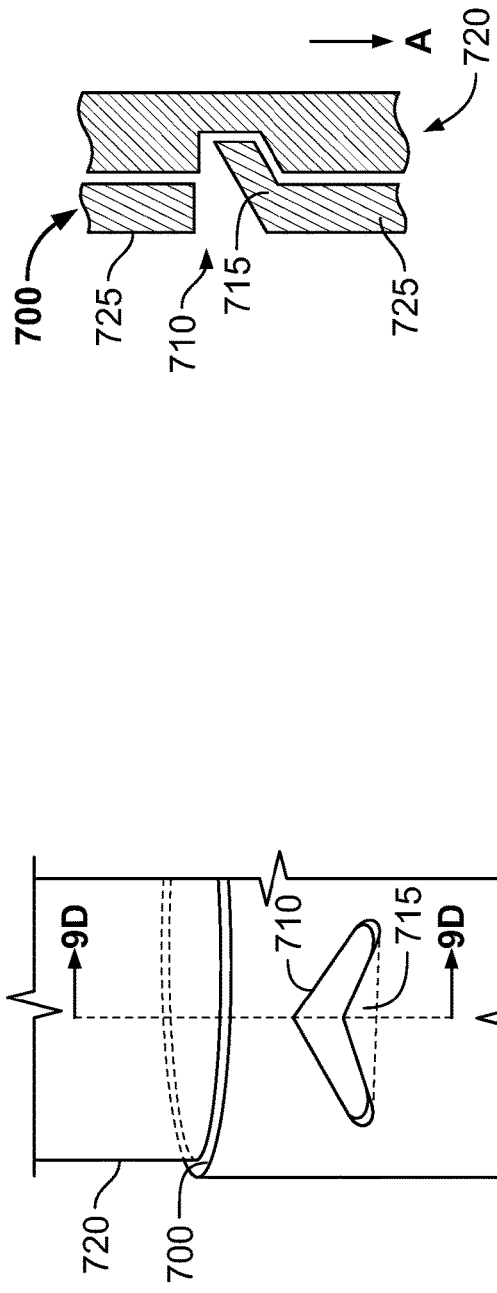
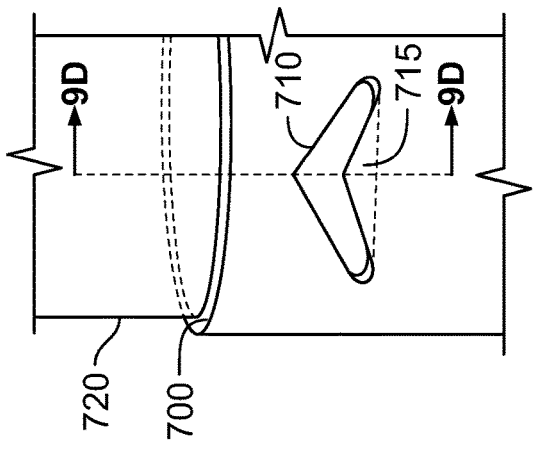

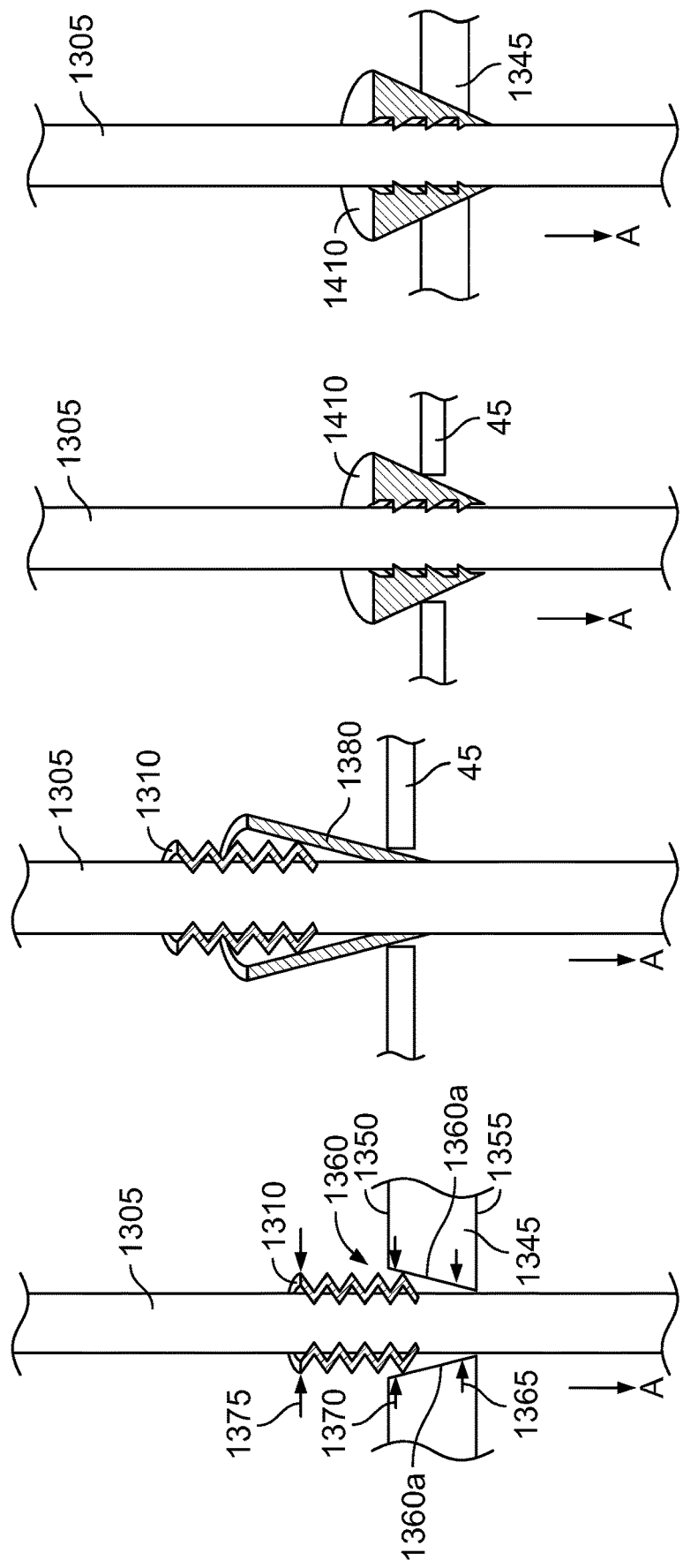

CABLE ANCHORING

CROSS-REFERENCE TO RELATED APPLICATION

The present application claims the benefit of the filing date of U.S. Provisional Application No. 62/964,357, filed on Jan. 22, 2020, the disclosure of which is hereby incorporated herein by reference.

TECHNICAL FIELD

The present disclosure generally relates to securing cables, and more particularly, to securing fiber optic cables in a manner resistant to pulling forces on the cables.

BACKGROUND

Cables are an important element in electronic communication. For example, cables may be used to transmit communication signals, and many communication networks employ cables to connect network elements. In high-speed communication networks, for instance, fiber optic cables are often used to route wireless signals between users' homes and an outside patch panel. Such fiber optic cables must be able to withstand the physical stresses imposed upon them by the environment. One type of stress endured by the cables is a pulling-force, which is a force experienced along the length of the cable and which may cause damage to the fiber within the cable or may cause the cable to be pulled loose from an anchoring point, such an anchoring point at a patch panel. Accordingly, there is a need for techniques to anchor fiber optic cables in a way that will protect them against pulling forces.

SUMMARY

It has been recognized that current cable anchoring techniques are often expensive and time consuming, and that in view of the proliferation of fiber optic cables in high-speed communications networks, there is a lot to be gained by creation of a cable anchoring that is cost effective and easy to deploy.

The presently disclosed technology provides for low cost cable anchoring that is cost effective and easy to deploy. In accordance with an aspect of the technology a system includes a sheath having a first end and a second end, wherein the sheath includes a threaded portion; at least one elongated member positioned within the sheath, the at least one elongated member extending at least between the first and the second end of the sheath; an anchor configured to threadably engage with the threaded portion of the sheath, the anchor having a first dimension; and a stopper wall including an opening having an opening dimension, the opening dimension being smaller than the first dimension, wherein the opening is configured to receive the sheath when the anchor is threadably engaged with the threaded portion of the sheath.

In accordance with another aspect of the technology a system includes a sheath having a first end and a second end; at least one elongated member positioned within the sheath, the at least one elongated member extending at least between the first and the second end of the sheath; a crimp ring configured to be secured to the sheath, the crimp ring having a first dimension; and a stopper wall including an opening having an opening dimension, the opening dimension being smaller than the first dimension, wherein the opening is configured to receive the sheath when the crimp ring is secured to the sheath.

In accordance with still another aspect of the technology a system includes a sheath having a first end and a second end; at least one elongated member positioned within the sheath, the at least one elongated member extending at least between the first and the second end of the sheath; an anchor configured to be secured to the sheath, the anchor having a first dimension; and a stopper wall including an opening having an opening dimension, the opening dimension being smaller than the first dimension, wherein the opening is configured to receive the sheath when the anchor is secured to the at least one end of the sheath.

BRIEF DESCRIPTION OF THE DRAWINGS

The foregoing aspects, features and advantages of the present disclosure will be further appreciated when considered with reference to the following description of exemplary embodiments and accompanying drawings, wherein like reference numerals represent like elements. In describing the exemplary embodiments of the present disclosure illustrated in the drawings, specific terminology may be used for the sake of clarity. However, the aspects of the present disclosure are not intended to be limited to the specific terms used.

FIGS. 2A-2C show a fourth embodiment.

FIGS. 9A-9D describe alternative crimp rings that may be used according to any of the crimping embodiments.

FIGS. 16A-16D are cross-sectional perspective views of crimping embodiments that may be used alone or in combination with other crimping embodiments.

DETAILED DESCRIPTION

Figure 1A:
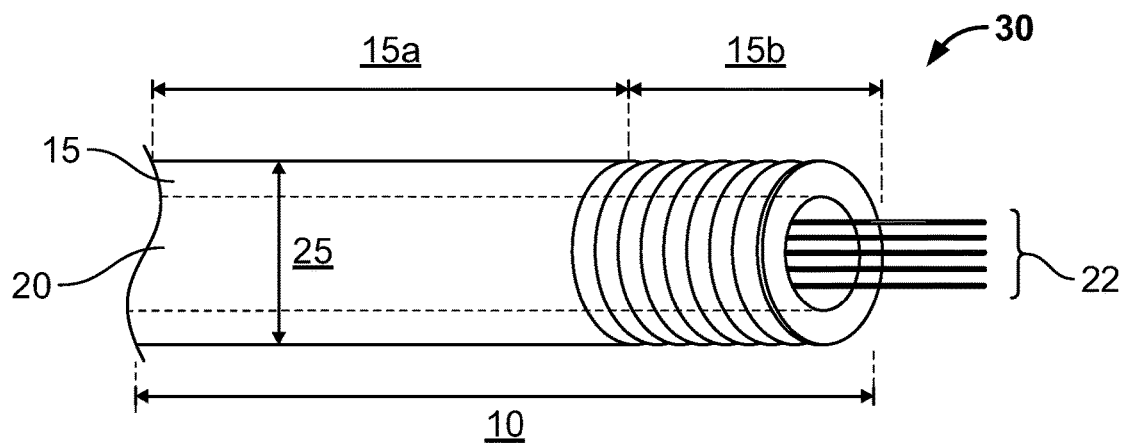
FIGS. 1A-1E show a cable anchoring system according to a first embodiment.

FIGS. 1A-1E show a cable anchoring system according to a first embodiment of the present technology. FIG. 1A is an isometric view showing a cable 10 including a sheath 15 and elongated members 20. The sheath 15 includes an unthreaded portion 15a and a threaded portion 15b. Both the unthreaded portion 15a and threaded portion 15b of the sheath have a generally circular cross-section with a diameter 25. The threaded portion 15b of the sheath 15 is provided at one end 30 of the sheath 15. The other end of the sheath 15 is not shown. The elongated members 20 may extend at least from the one end 30 of the sheath 15 to the other end of the sheath 15, and may extend past the one end 30 of the sheath and the other end of the sheath. In the FIG. 1A embodiment, the elongated members 20 are a multiple of transmission lines 22 extending past the one end 30 of the sheath.

In the FIG. 1A embodiment, and in all other embodiments to be described, the elongated members may be transmission lines 22. The transmission lines 22 may be, for example, fiber optic lines, and the fiber optic lines may take the form of a ribbon cable, or each fiber optic line may be a bare fiber or a bare fiber positioned within a jacket. Alternatively, the transmission lines 22 may be electrical lines, such as copper wires or twisted-shielded-pair lines. Moreover, the elongated members 20 need not include a multiple of members, but rather, may be a single element, such as a single fiber optic line or a single twisted-shielded-pair line, and thus the terminology "elongated members" and "transmission lines" are used merely for ease of description and should be understood to respectively include the cases of a single elongated member and a single transmission line.

It should also be noted that the elongated members 20 are not limited to transmission lines 22. For example, the elongated members 20 may include both transmission lines 22 and strength members (not shown in FIG. 1A). The strength members may be, for instance, yarn, or metal wire, or a combination of yarn and metal wire. Also, like the transmission lines 22, the strength members may extend at least from the one end 30 of the sheath 15 to the other end of the sheath 15, and may extend past the one end 30 the sheath and the other end of the sheath. Further, the strength members need not include a multiple of members, but rather, may be a single element, such as a single strength member, and thus the terminology "strength members" is used merely for ease of description and should be understood to include the case of a single strength member.

In addition, it should be noted that the strength members are not limited to being separate from the sheath 15. That is, as an alternative to the strength members being an element separate from the sheath 15 the strength members may be partially integrated with the sheath 15, entirely integrated with the sheath 15, or affixed to the sheath 15 by an adhesive or other means. Nevertheless, for ease of description the strength members will be referred to throughout this description as a separate element, with the understanding such strength members could be readily incorporated either partially or entirely within a sheath. The strength members will be discussed in more detail below.

Figure 1B:
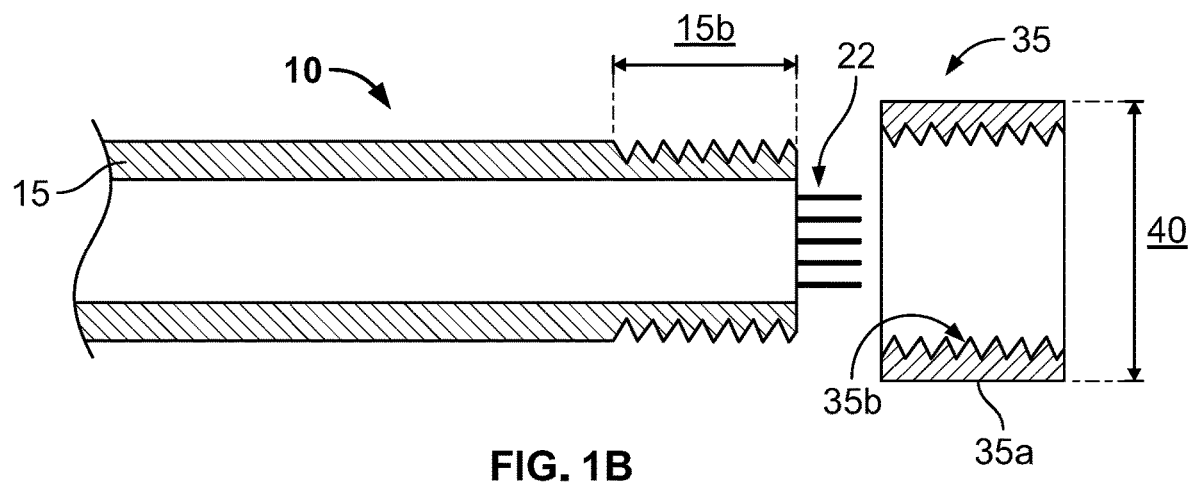
Figure 1C:
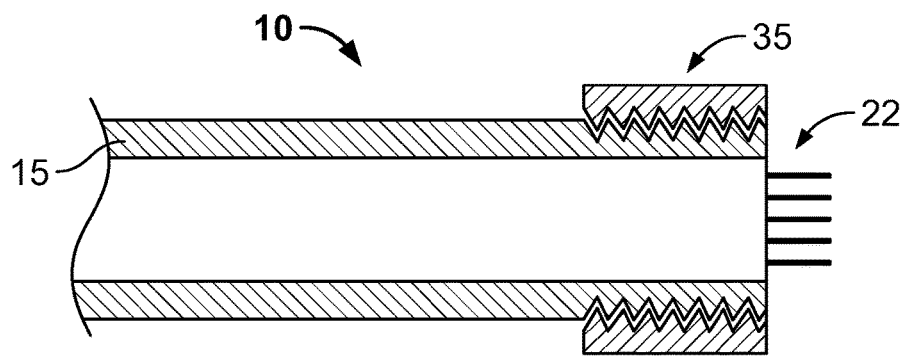

Referring now to FIG. 1B, the cable 10 is shown with an anchor 35. The anchor 35 is in the form of a ring with an outer surface 35a, a threaded inner surface 35b, and a dimension 40. The outer surface 35a may have a circular cross section, in which case the dimension 40 would be outer diameter of the surface, although the outer surface is not restricted to having a circular cross-section and may, for instance, have a rectangular cross-section, an oval cross-section, or an irregular cross-section. The threaded inner surface 35b of the anchor 35 is configured to threadably engage with the threaded portion 15b of the sheath 15, as shown in FIG. 1C.

Figure 1D:
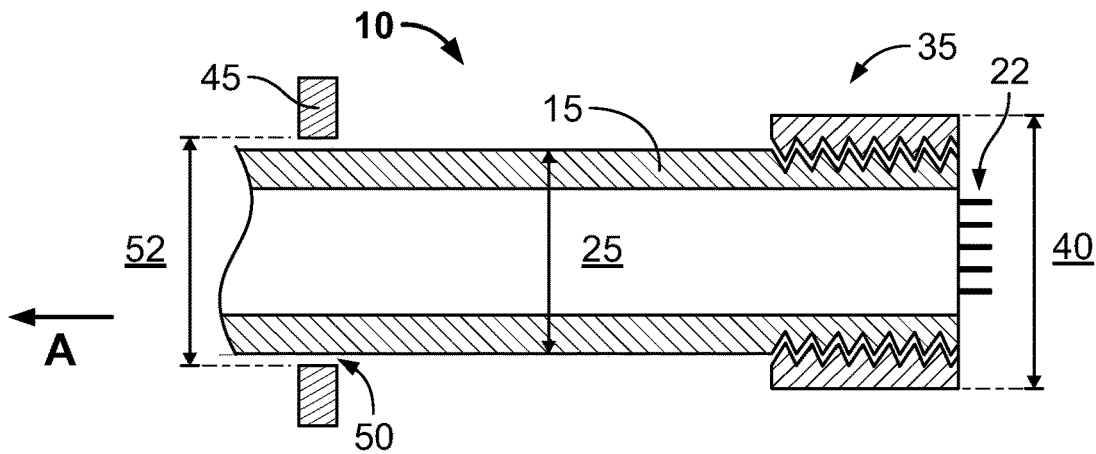
Figure 1E:
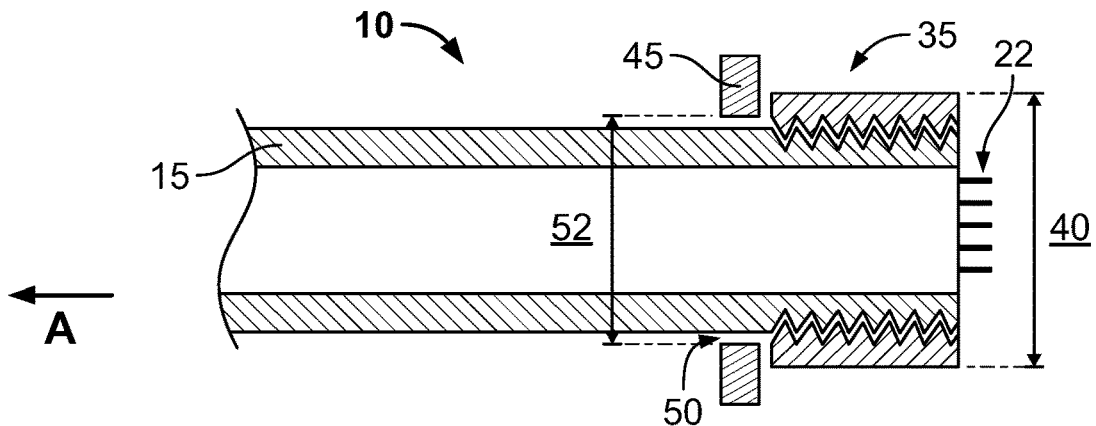

FIG. 1D shows the cable 10 and anchor 35 positioned within a stopper wall 45. The stopper wall 45 is has an opening 50 with a dimension 52 and is configured to receive the sheath 15 within the opening 50. The dimension 52 is larger than the diameter 25 of the sheath 15 or substantially corresponds to the diameter 25 of the sheath, but is smaller than the dimension 40 of the anchor 35. Thus, if a pull force is exerted on the cable 10 in the direction shown by arrow A, the anchor 35 will prevent the cable 10 from being pulled entirely past the stopper wall 45. In this manner a simple, highly effective system is provided for preventing damage to transmission lines 22 that might result from pulling cable 10 any further in direction A than shown in FIG. 1E. Such system is cost effective and can easily be installed by a field technician.

Figure 1F:
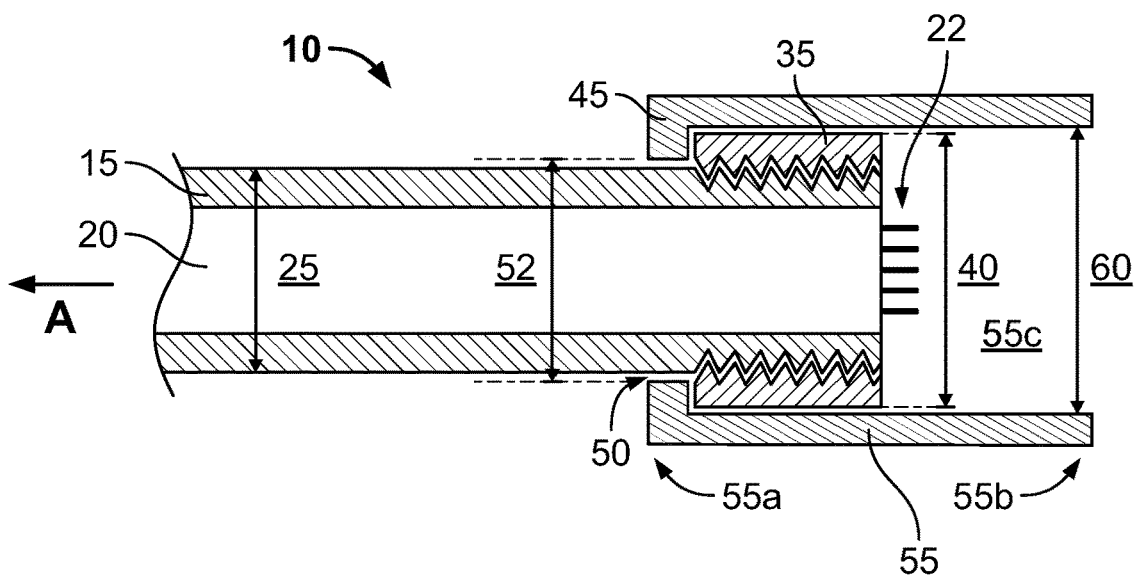
FIG. 1F shows a cross-sectional view of a second embodiment.

Referring now to FIG. 1F, there is shown a cross-sectional view of a second embodiment. The FIG. 1F embodiment is similar to the embodiment of FIGS. 1A to 1E with the exception that the stopper wall 45 is part of a housing 55. The stopper wall is located at a first end 55a of the housing 55, opposite a second end 55b of the housing 55. The second end 55b is shown as being open in FIG. 1F to illustrate that the second end 55b has many possible configurations. For example, the second end 55b may be a simple wall, may be another stopper wall, or may couple to another housing. In any event, the housing defines an opening 55c having a cross-sectional dimension 60. The opening 55c is configured to receive arrangement of the sheath 15 with threaded anchor 35, and as such the cross-sectional dimension 60 is generally larger than the dimension 40 or the cross-sectional dimension substantially corresponds to the dimension 40. Thus, if a pull force is exerted on the cable 10 in the direction shown by arrow A, the anchor 35 will prevent the cable 10 from being pulled out of the housing.

Figure 1G:
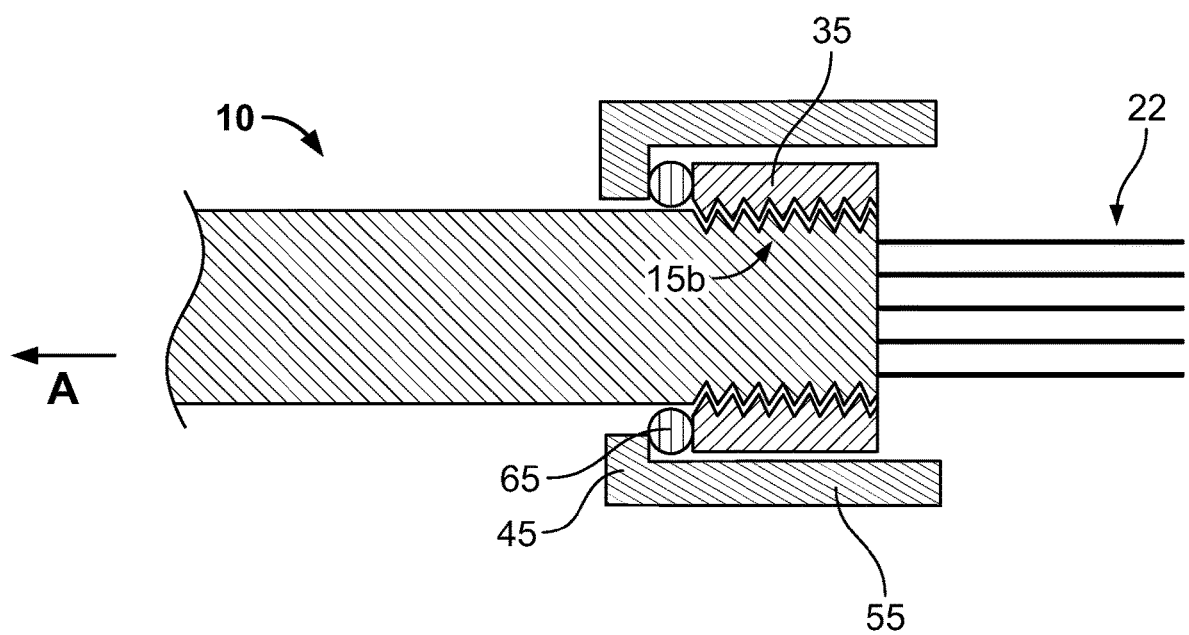
FIG. 1G shows a cross-sectional view of a third embodiment.

FIG. 1G shows a cross-sectional view of a third embodiment. The FIG. 1G embodiment is similar to the embodiment of FIG. 1F, although the FIG. 1G embodiment includes a sealing element 65. The sealing element 65 may take the form of a gasket or O-ring and serves to seal the inside of housing 55 from exposure the environment by placing a barrier between the inside of the housing and opening 50. The sealing element may also act as a stress-absorber to help reduce the instantaneous stress experienced by anchor 35 and cable 10 when the cable 10 is pulled in direction A.

FIGS. 2A-2C show a fourth embodiment. FIG. 2A is an isometric view of a cable 100 according the fourth embodiment. The cable 100 includes sheath 115 about elongated members 20. The sheath 115 includes an unthreaded portion 115a and a threaded portion 115b. The threaded portion is spaced from one end 130 of the fiber and the other end (not shown) of the fiber. Both the unthreaded portion 115a and the threaded portion 115b of the sheath 115 have a generally circular cross-section of diameter 25. The elongated members may include transmission lines 22, which may extend past the one end 130 of the sheath 115 and past the other end of the sheath, or from the one end 130 of the sheath 115 to the other end of the sheath 115.

In FIG. 2B, the cable 100 is shown with anchor 35 and positioned within stopper wall 45. The fourth embodiment functions in the same manner as the embodiment of FIGS. 1A-1E, with the exception that the threaded 150b portion of the cable 100 and the anchor 35 are not arranged at the end 130 of the cable 100 but rather at a location between the end 130 and other end (not shown) of the cable 100. Thus, if a pull force is exerted on the cable 100 in the direction A the anchor 35 will prevent the cable 100 from being pulled entirely past the stopper wall 45, as shown in FIG. 2C.

Figure 3A:
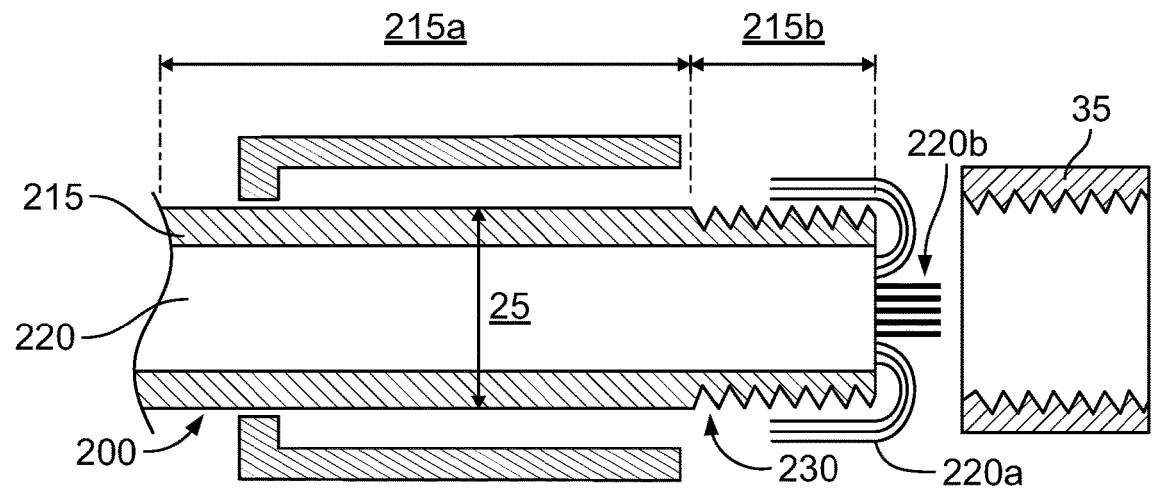
FIGS. 3A and 3B show cross-sectional views of a fifth embodiment.
Figure 3B:
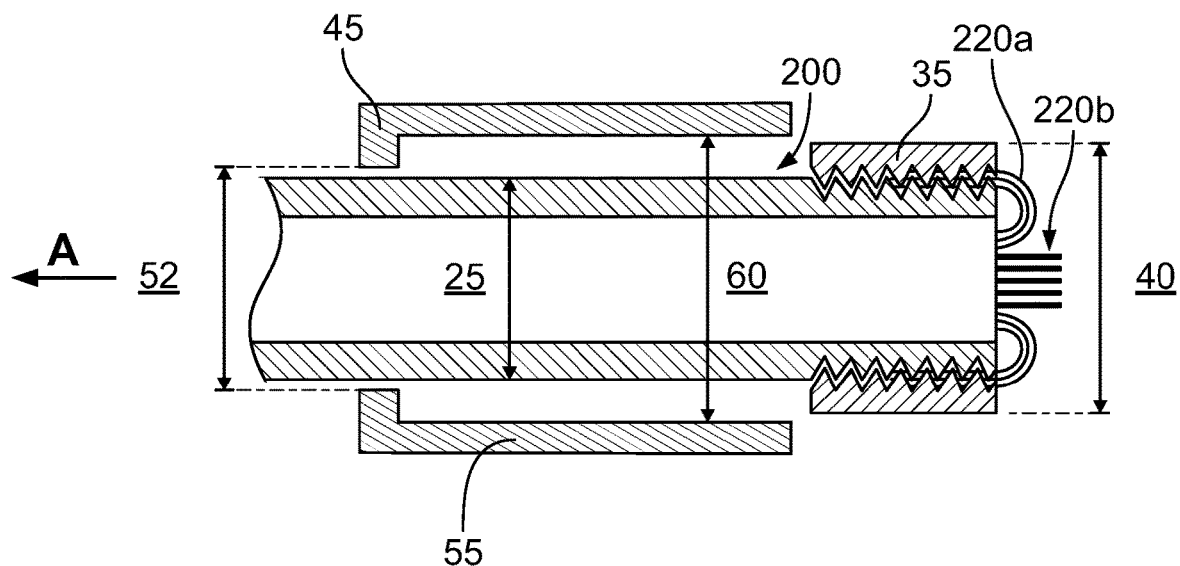

FIGS. 3A and 3B show cross-sectional views of a fifth embodiment. As can be seen from FIG. 3A, the embodiment includes a cable 200 having a sheath 215 and elongated elements 220. The sheath 215 includes an unthreaded portion 215a and a threaded portion 215b. Both the unthreaded portion 215a and threaded portion 215b of the sheath have a generally circular cross-section with a diameter 25. The threaded portion 215b of the sheath 215 is provided at one end 230 of the sheath 215. The other end of the sheath 215 is not shown. The elongated elements 220 extend past the one end 230 of the sheath 215 and past the other end of the sheath 215, and included one or more strength members 220a and transmission lines 220b. The strength members 220a are provided to impart tensile strength to the cable 200. The strength members 220a extend past the end 230 of the cable 220 and generally alongside the threaded portion 215b of the sheath 215. The anchor 35 is then threadably engaged with the threaded portion 215b of the sheath with the strength members 220a secured between the anchor 35 and threaded portion 215b. The resulting structure is shown in FIG. 3B in use with housing 55.

Referring to 3B, the fifth embodiment is shown as implemented with housing 55. However, it should be noted that the embodiment is not restricted to the housing embodiment and may, for instance, be implemented with only stopper wall 45. In any event, the anchor 35 of the fifth embodiment acts to prevent the cable 200 from being pulled out of the housing 55 when a force acting in direction A is exerted on the cable 200. Further, the positioning of the strength members 220a between the threads of the anchor 35 and the threads of the sheath 215 help secure the strength members within the housing 55 in the event the strength members are pulled in direction A.

Figure 4A:
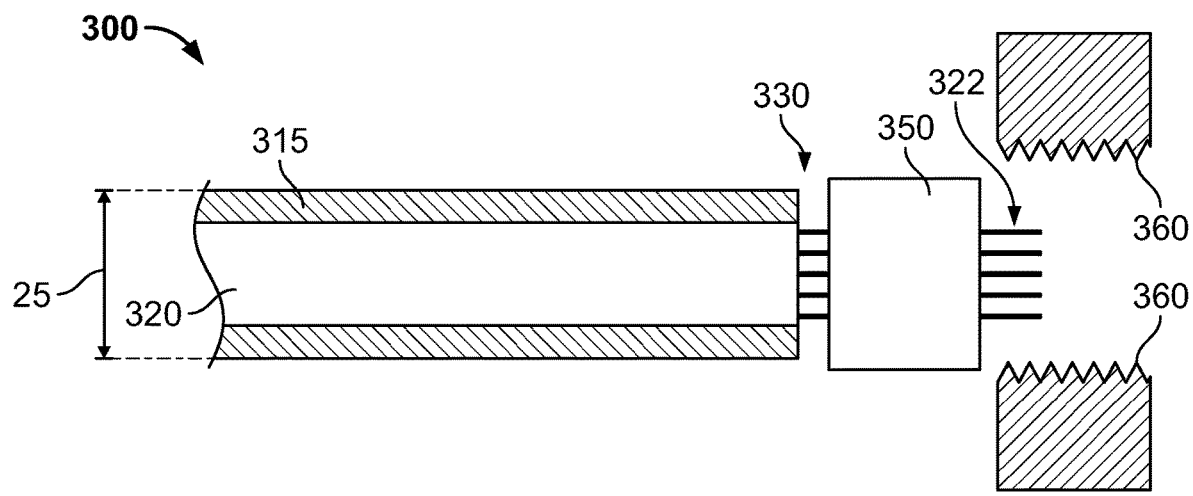
FIGS. 4A-4D show cross-sectional views of a sixth embodiment.
Figure 4B:
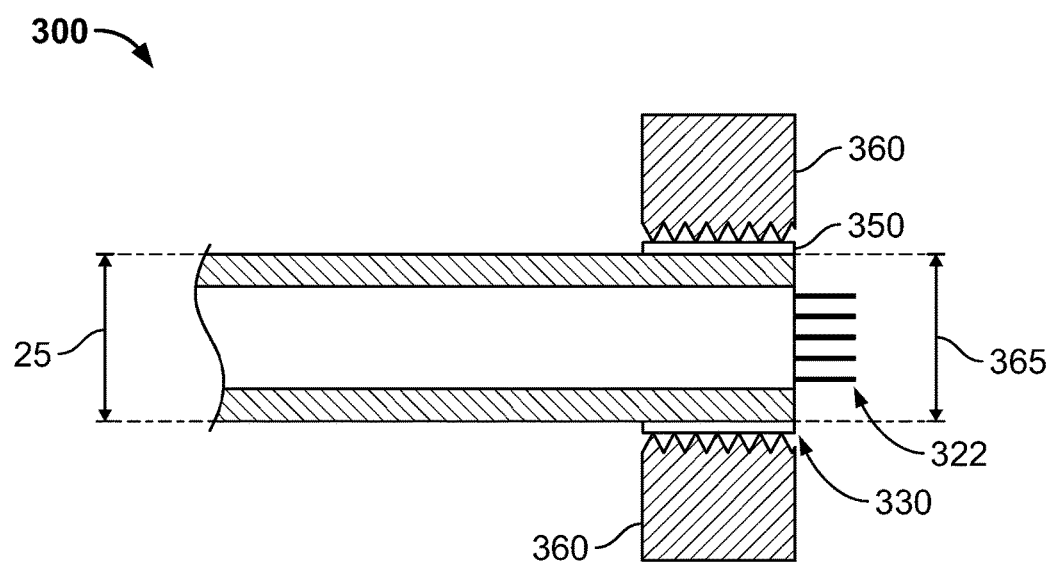

FIGS. 4A-4D show cross-sectional views of a sixth embodiment. As can be seen from FIG. 4A, the embodiment includes a cable 300 having a sheath 315 and elongated members 320 including transmission lines 322, and a crimp ring 350. The crimp ring is placed over one end 330 of cable 300 and then a crimp die 360 is used to crimp the crimp ring 350, as shown in FIG. 4B. The crimp ring 350 may have a generally circular cross-section, although other types of crimp rings may be used and it is not necessary for the crimp ring 350 to have generally circular cross-section. In any case, the crimp ring 350 has a dimension 365 sufficient to allow the crimp ring 350 to be fitted over the sheath 315 prior to application of the crimp die. In FIG. 4B, dimension 365 is a diameter.

Figure 4C:
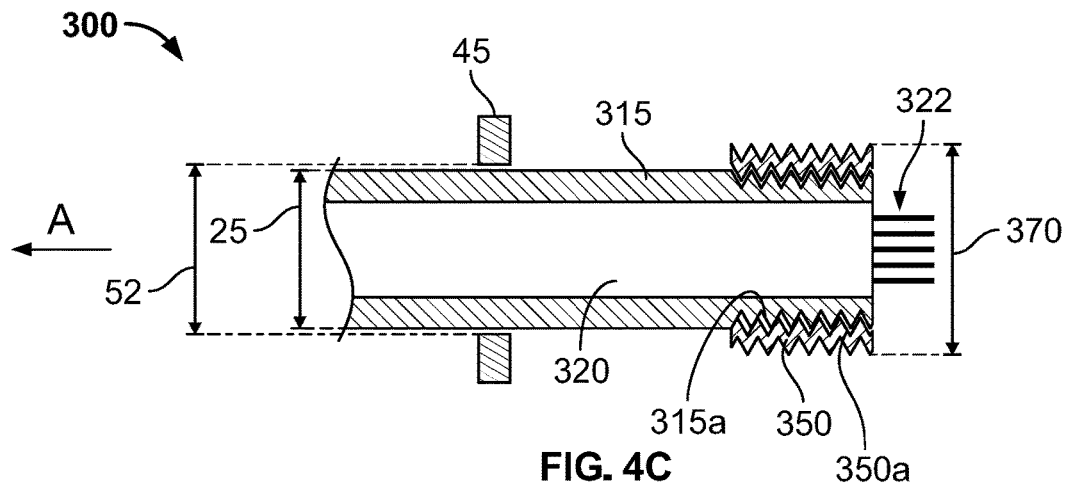

FIG. 4C shows crimp ring 350 in crimped form and thereby secured to sheath 315. As can be seen from FIG. 4C the crimping of crimp ring 350 causes the formation of protrusions 350a on the inner surface of the crimp ring 350 and corresponding deformations 315a on the outer surface of the sheath 315. The seating of protrusions 350a in deformations 315a, in addition to the compression force of the crimped crimp ring 350, secure the crimp ring 350 on the cable 300. In its crimped form the crimp ring 350 has a dimension 370, which in the depicted configuration is an outer diameter of the crimped crimp ring.

Figure 4D:
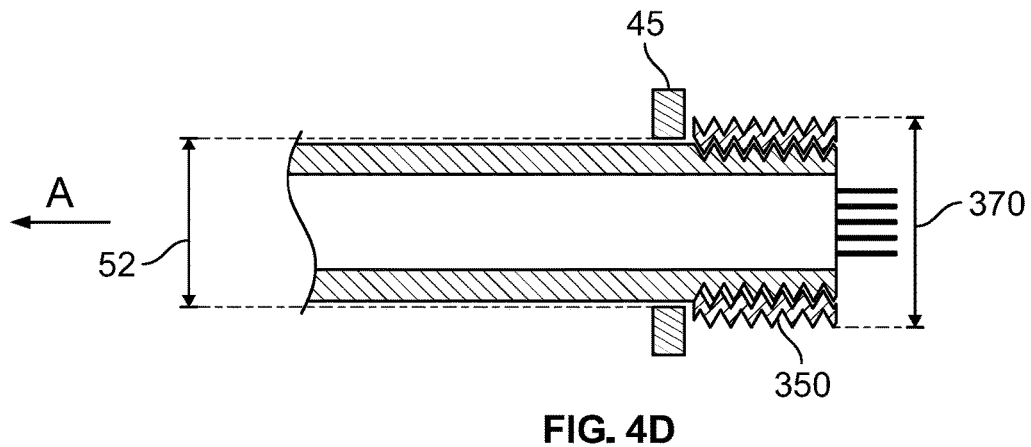

FIG. 4C also shows the assembly of the cable 300 and crimped crimp ring 350 positioned within stopper wall 45. The dimension 370 of the crimped crimp ring 350 is larger than the dimension 52 of the opening of the stopper wall. Thus, if a force acts on the cable 300 in a direction A the crimped crimp ring 350 prevents the cable from being moved past the stopper wall 45, as shown in FIG. 4D. That is, the crimped crimp ring 350 acts as an anchor.

Figure 4E:
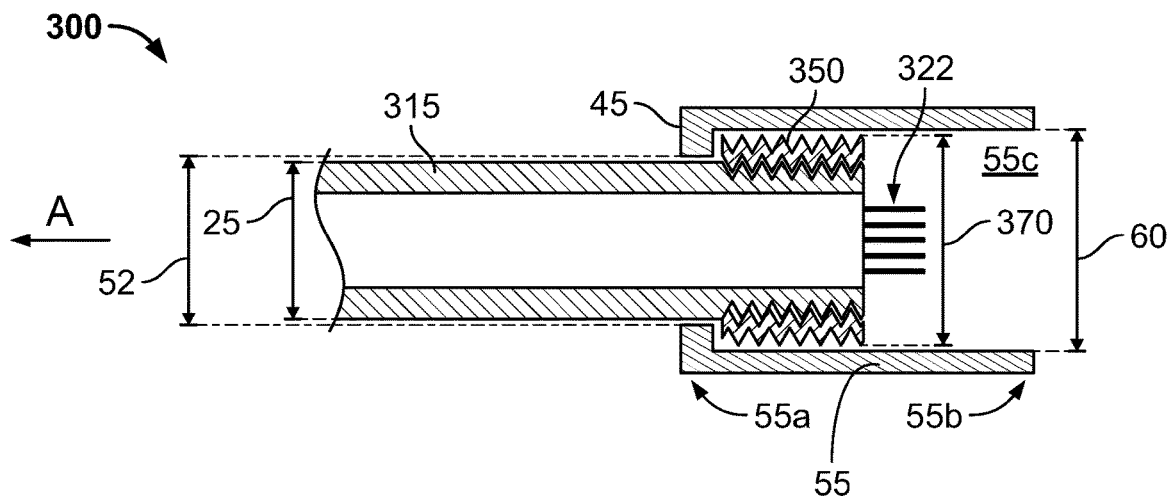
FIG. 4E shows a cross-sectional view of a seventh embodiment.

FIG. 4E shows a cross-sectional view of a seventh embodiment. The embodiment shown in FIG. 4E is similar to the embodiment shown on FIG. 1F, but with anchoring being provided by crimping crimp ring 350 onto cable 300 rather than by threading anchor 35 onto cable 10. In the case of the FIG. 4E embodiment, housing opening 55c is configured to receive the arrangement of the sheath 315 with threaded crimped crimp ring 350, and as such the cross-sectional dimension 60 is generally larger than the dimension 370 or the cross-sectional dimension 60 substantially corresponds to the dimension 370. Thus, if a pull force is exerted on the cable 300 in the direction shown by arrow A, the crimped crimp ring 350 will prevent the cable 300 from being pulled out of the housing 55.

Figure 5A:
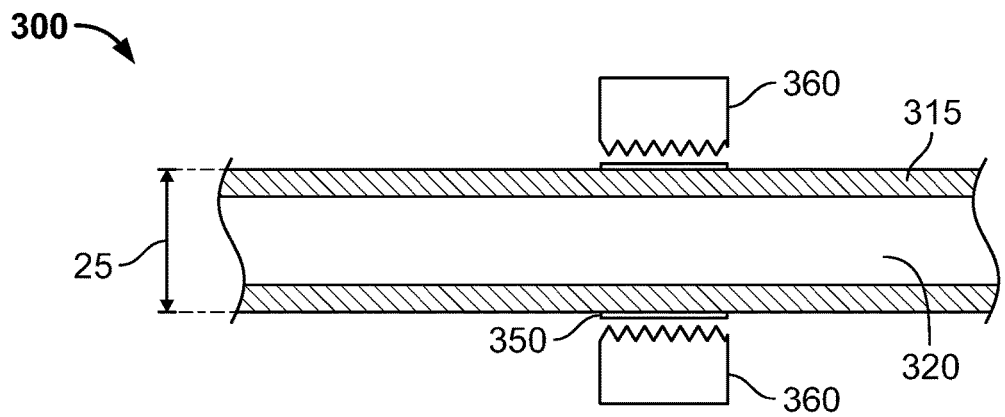
FIGS. 5A-5C show cross-sectional views of an eighth embodiment.
Figure 5B:
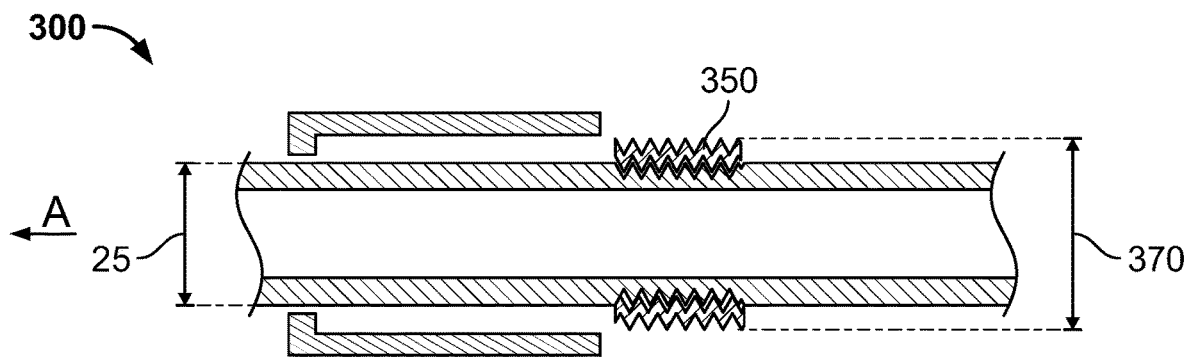
Figure 5C:
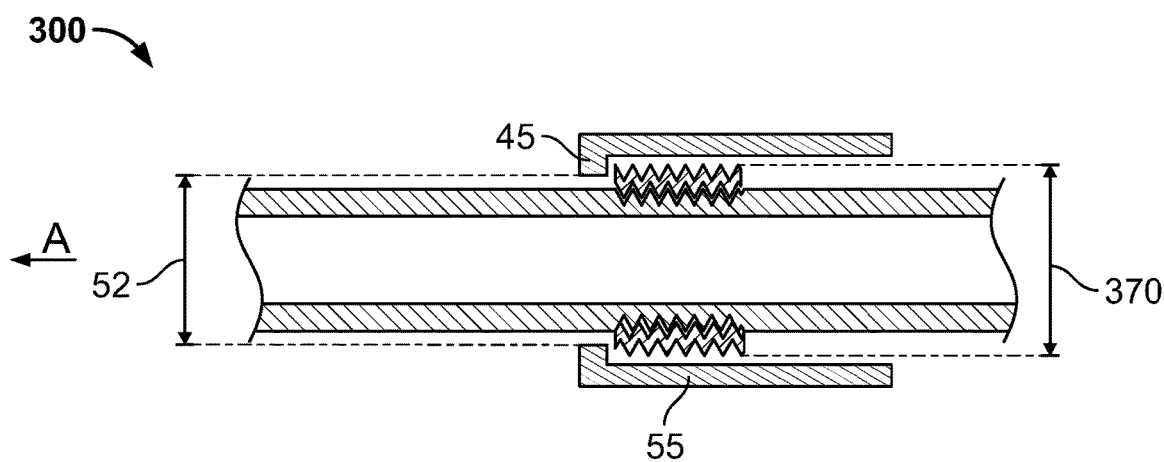

FIGS. 5A-5C show cross-sectional views of an eighth embodiment. The eighth embodiment is similar to the embodiment shown in FIG. 4E, but with the crimp ring 350 being placed away from either end of cable 300 and then crimped such that the crimped ring 350 serves as an anchor positioned away from either end of the cable, as shown in FIGS. 5B and 5C. The crimped crimp ring 350 prevents the cable 300 from being pulled out of housing 55 by virtue of dimension 370 being larger than dimension 52, as shown in FIG. 5C. Also, as is the case with other embodiments, the embodiment of FIGS. 5A-5C is not limited to implementation with housing 55. For example, the cable 300 with crimped crimp ring 350 away from the ends of the cable 300 may be used with only stopper wall 45 rather than with stopper wall 45 being part of housing 55, or used with stopper wall 45 being part of a housing that differs from housing 55.

Figure 6A:
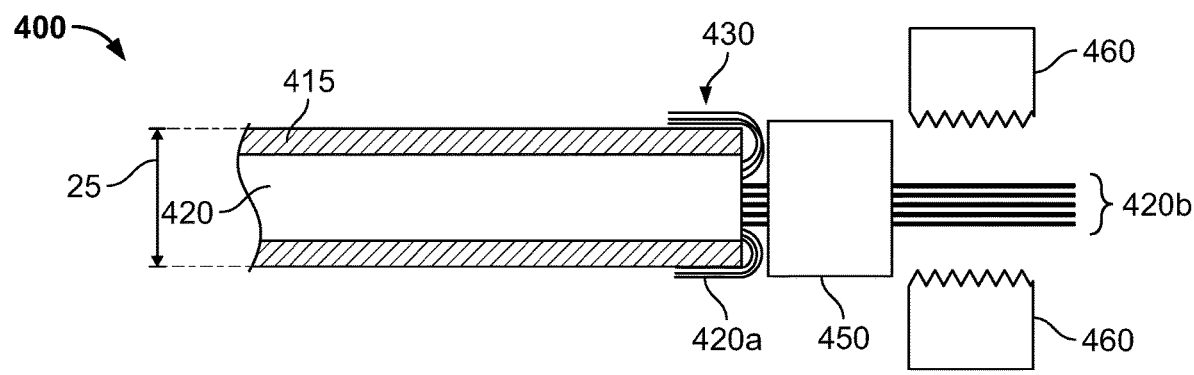
FIGS. 6A and 6B show cross-sectional views of a ninth embodiment.
Figure 6B:
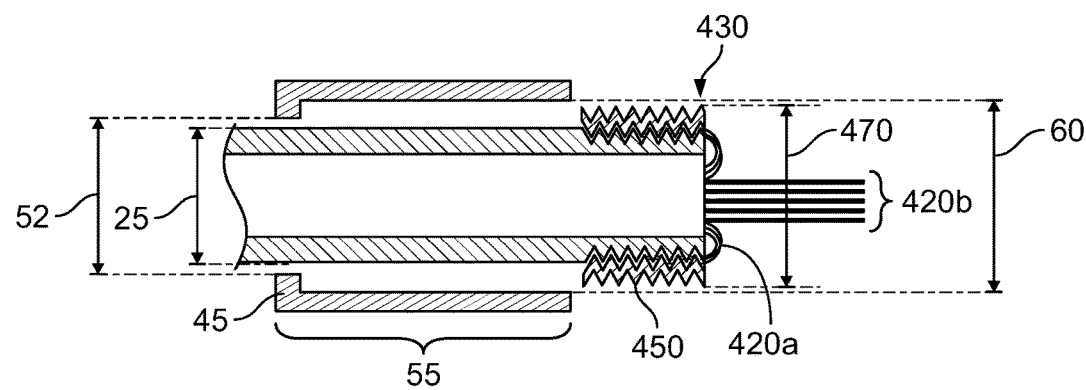

Referring now to FIGS. 6A and 6B, there are shown cross-sectional views of a ninth embodiment. As can be seen from FIG. 6A the embodiment includes a cable 400 having a sheath 415 and elongated members 420. The elongated members 420 may extend past one end 430 of the sheath 415 and past another end (not shown) of the sheath 415, and include one or more strength members 420a and a multiple of transmission lines 420b. The strength members 420a are provided to impart tensile strength to the cable 400. The strength members 420a are positioned alongside an outer surface the cable 420 proximate the end 430. The crimp ring 450 is then positioned over the strength members 420a and cable 420 at a location proximate the end 430 and crimped using a crimp die 460. The resulting structure is shown in FIG. 6B in use with housing 55, although it should be noted that the ninth embodiment is not restricted to the housing embodiment and may, for instance, be implemented using only stopper wall 45.

Referring to FIG. 6B, the crimped crimp ring 450 of the ninth embodiment has a dimension 470 larger than the dimension 52, and as such the crimped crimp ring acts as an anchor to prevent the sheath 415 from being pulled out of the housing 55 when a force acting in direction A is exerted on the sheath 415. Further, the positioning of the strength members 420a between the crimped crimp ring 450 and the sheath 415 help secure the strength members 420a within the housing 55 in the event the strength members 420a are pulled in direction A.

Figure 7A:
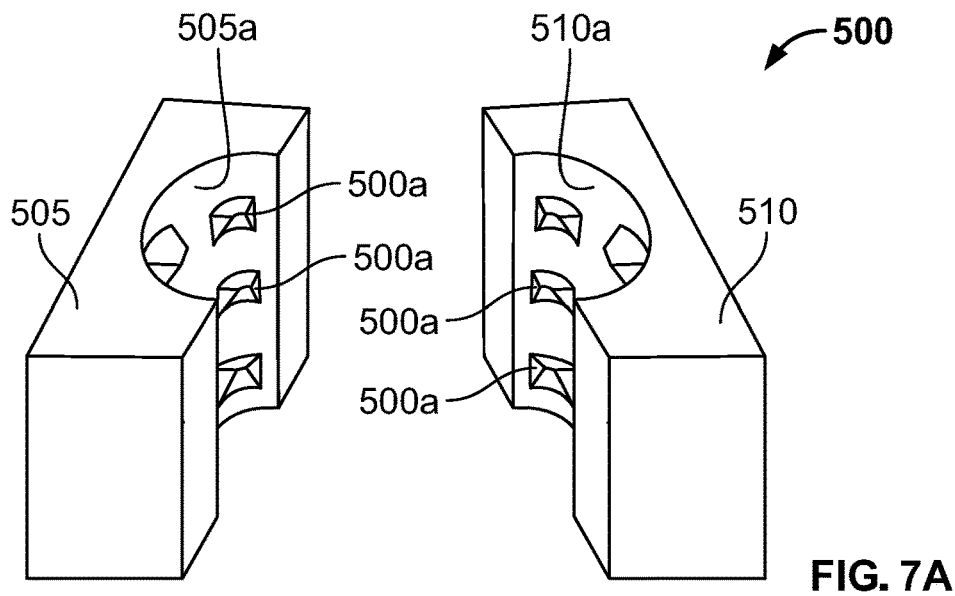
FIG. 7A is a perspective view of a crimp die that may be used according to any of the crimping embodiments.

FIG. 7A is a perspective view of a crimp die 500 that may be used according to any of the crimping embodiments. As can be seen from FIG. 7A, the crimp die 500 is made up of two halves, 505 and 510, although it should be noted that a crimp die according to the present technology is not limited to two halves and may be for example made up of two parts that are not halves, three part, or any number of parts. The halves 505 and 510 of crimp die 500 are applied to a crimp ring at the same time so as to substantially enclose at least a portion of the crimp ring between the halves 505 and 510. Then a force is applied to urge the two halves 505 and 510 together such that the halves exert a force on the crimp ring, thereby crimping the crimp ring. Further, the crimp die 500 includes a multiple of protrusions 500a that are positioned on an inner surface 505a of halve 505 and an inner surface 510a of halve 510. The protrusions 500a act to create corresponding crimp pattern on a crimp ring that is crimped by crimp die 500. The protrusions 500a may be oriented in a manner that creates crimp pattern to that helps prevent movement in a specified direction between the crimped ring and elements held by the crimped ring.

Figure 7B:
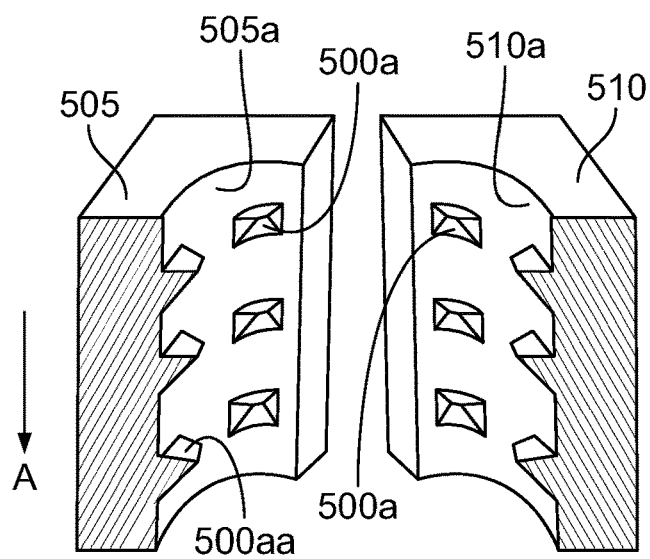
FIG. 7B is a cross-sectional perspective view of the crimp die of FIG. 7A.

FIG. 7B is a cross-sectional perspective view of the crimp die of FIG. 7A. As can be seen from FIG. 7B, protrusions 500a have a generally triangular cross-section with one side of each triangular cross-section, for example side 500aa, being oriented perpendicular to a direction A and configured to oppose motion along direction A. In this manner the protrusions 500a will form a corresponding pattern in a crimp ring crimped with the crimp die 500 and the corresponding pattern will resist movement of elements held by the crimped ring in a direction A relative to the crimped ring.

Figure 7C:
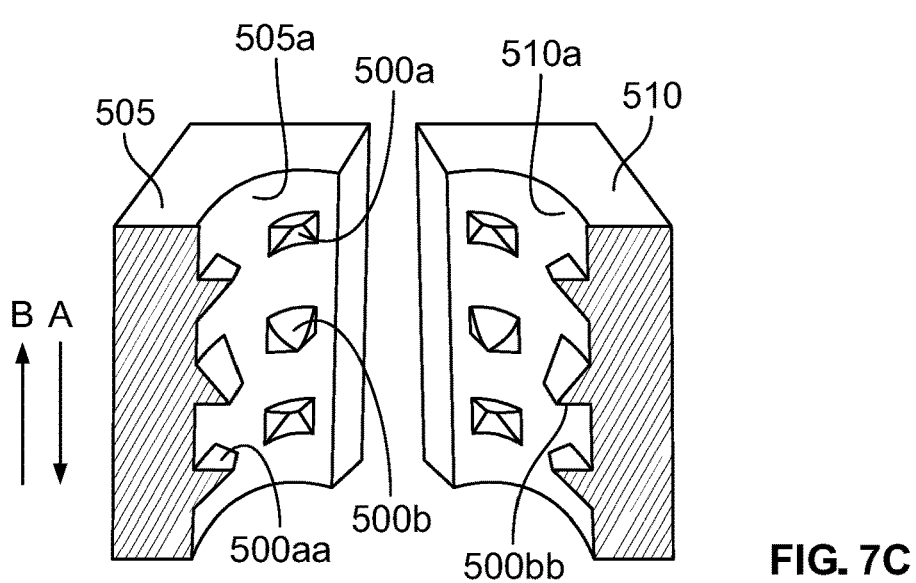
FIG. 7C is a cross-sectional perspective view of an alternative crimp die that may be used according to any of the crimping embodiments.

FIG. 7C is a cross-sectional perspective view of an alternative crimp die that may be used according to any of the crimping embodiments. In the FIG. 7C embodiment, protrusions 500a include two types of protrusions, protrusions 500a and protrusions 500b. Protrusions 500b have triangular cross-sections like protrusions 500a but are oriented such that each triangular cross-section of protrusions 500b has a side, for example 500bb, that is perpendicular to a direction B and configured to oppose motion along direction B. In this manner the protrusions 500a and 500b will form a corresponding pattern in a crimp ring crimped with the crimp die 500 and the corresponding pattern will resist movement of elements held by the crimped ring in both directions A and B relative to the crimped ring.

In the configurations of FIGS. 7A-7C the form of the protrusions 500a and 500b are provided for purposes of illustration. The wide variety of protrusion forms that may be used with the present technology will be readily appreciated in view of the present disclosure.

Figure 8A:
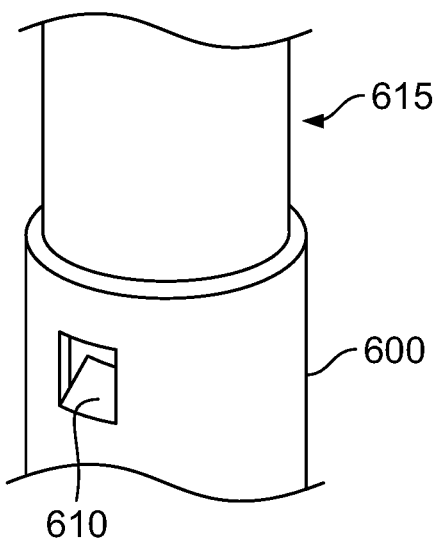
FIGS. 8A-8D describe a crimp ring that may be used according to any of the crimping embodiments.
Figure 8B:
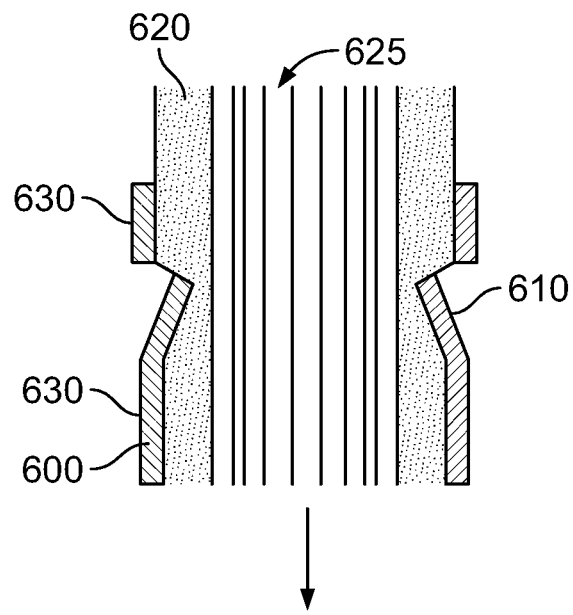
Figure 8C:
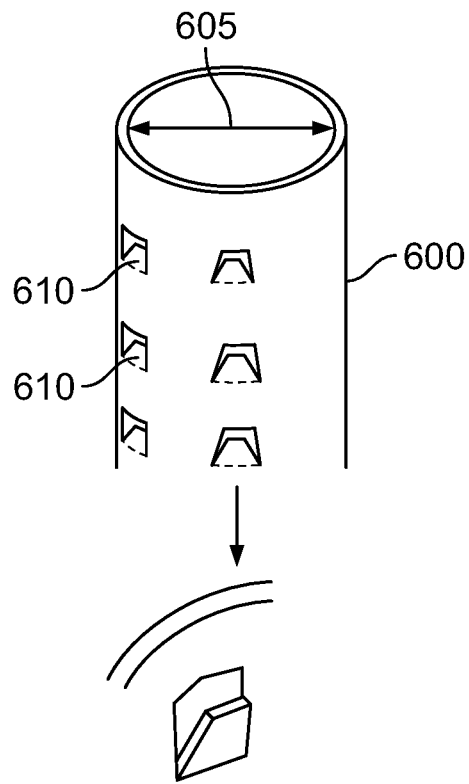

FIGS. 8A-8D describe a crimp ring 600 that may be used according to any of the crimping embodiments. The crimp ring 600 has a cylindrical shape with a diameter 605 and a plurality of recessed portions 610. The recessed portions 610 extend toward the longitudinal access of the crimp ring 600 and are provided so that when the crimp ring is crimped about a cable 615 the recessed portions will resist relative movement between the crimp ring and the cable in a given direction. In the example of FIG. 8B the crimp ring 600 is shown crimped around cable 615, the cable including a sheath 620 and a multiple of elongated members 625. As can be seen from FIG. 8B, the recessed portions 610 of the crimp ring 600 compress the sheath 620 to a greater degree than non-recessed 630 portions of the crimp ring. In this configuration movement of the sheath 620 relative to the crimp ring 600 is resisted by the recessed portions 610 when the sheath is pulled in the direction A. The recessed portions 610 also resist movement when the sheath is pulled in a direction opposite direction A, but to a lesser extent because of the shape of the recessed portions.

Figure 8D:
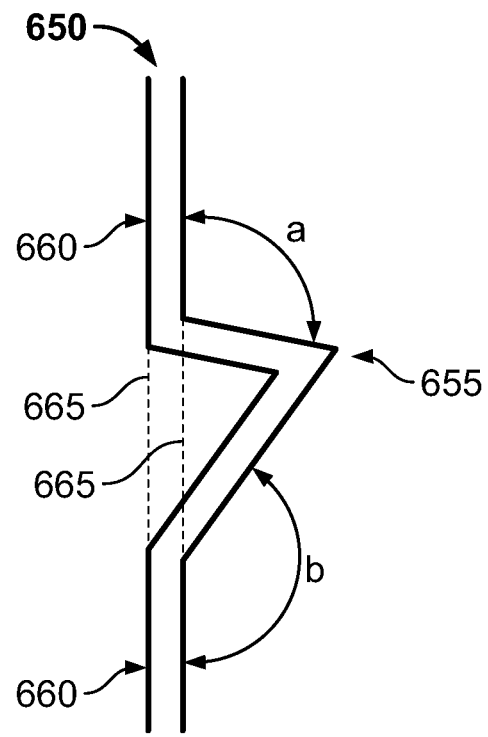

FIG. 8D illustrates on possible alternative form for the recessed portions. The figure shows a cross-section of a cylindrical crimp ring 650 taken along a longitudinally extending plane. The crimp ring 650 includes a recessed portion 655 and non-recessed portions 660. The recessed portion 655 is formed as a result of crimping the crimp ring 650. Prior to crimping, the part of the crimp ring 650 that forms recessed portion 655 conforms to the cylindrical shape of the crimp ring as shown by phantom lines 665. After crimping, the recessed portion 655 is formed as a dent extending toward the interior of the cylindrical crimp ring. The recessed portion 655 may also include an opening (not shown) that is formed as a result of crimping. In the illustrated configuration, the recessed portion 655 has a triangular cross-section with one side of the triangle forming an angle "a" with one of non-recessed portions 660, and another side of the triangle forming an angle "b" with one of the non-recessed portions. In some embodiments one of the triangular sides is perpendicular to, or substantially perpendicular to, one of the non-recessed portion 660, and another of the triangular sides is oriented at an obtuse angle relative to one of the non-recessed portions. As an example the angle "a" shown in FIG. 8D may be greater than or equal to 60 degrees and less than or equal to 90 degrees, while angle "b" is greater than 90 degrees. That is, in some embodiments "a" satisfies the equation $60°≤a≤90°$, and "b" satisfies the equation $60°<b$.

Turning now to FIGS. 9A-9D, there are shown alternative crimp rings that may be used according to any of the crimping embodiments. FIG. 9A shows a first type of crimp ring 700. FIG. 9B shows a second type of crimp ring 750. Both of crimp rings 700 and 750 are generally cylindrically shaped and both have cut-out portions. Crimp ring 700 has a diameter 705 and cut-out portions 710. Crimp ring 750 has diameter 755 and cut-out portions 760. Each of crimp rings 700 and 750 are configured so that a portion of the ring proximate the cut-out areas extends toward the interior of the ring upon crimping.

Crimp ring 700 includes generally boomerang-shaped cut-out areas 710. A detailed view of one of cut-out areas 710 is shown in FIG. 9C. As can be seen from FIG. 9C, crimp ring 700 includes a generally triangular area 715, generally denoted by a dotted line, immediately below each cut-out area 710. The triangular area 715 is configured to extend toward the interior of the crimp ring 700 when the crimp ring is crimped, for example, to a cable sheath 720. The resulting structure is illustrated in cross-section in FIG. 9D. As can be seen from FIG. 9D, the inwardly extending triangular areas 715 compress, or bite into, the sheath 720 to a greater degree than other areas 725 of the crimp ring 700. Thereby, movement of the sheath 720 relative to the crimp ring 700 is resisted by the crimped triangular areas 715 when the sheath is pulled in the direction A. The crimped triangular areas 715 also resist movement when the sheath is pulled in a direction opposite direction A, but to a lesser extent because of the shape of the crimped triangular areas.

Crimp ring 750 includes generally oval-shaped cut out areas 760. Like crimp ring 700, crimp ring 750 can provide inwardly extending areas that compress, or bite into, a cable sheath, although crimp ring 750 provides the inwardly extending areas in a different manner than crimp ring 750.

One way for crimp ring crimp ring 750 to provide inwardly extending areas is through positioning of a crimping die during crimping. For instance, if an upper longitudinal edge of a crimping die is positioned as denoted by line 765 and then compressed, at least areas 770 immediately below line 765 will become inwardly extending areas as a result of the crimping, with the cut out areas 760 facilitating inward movement of the areas 770 during crimping. Following crimping, the areas 770 will resist relative movement of the crimp 750 relative to a crimped element.

Figure 10:
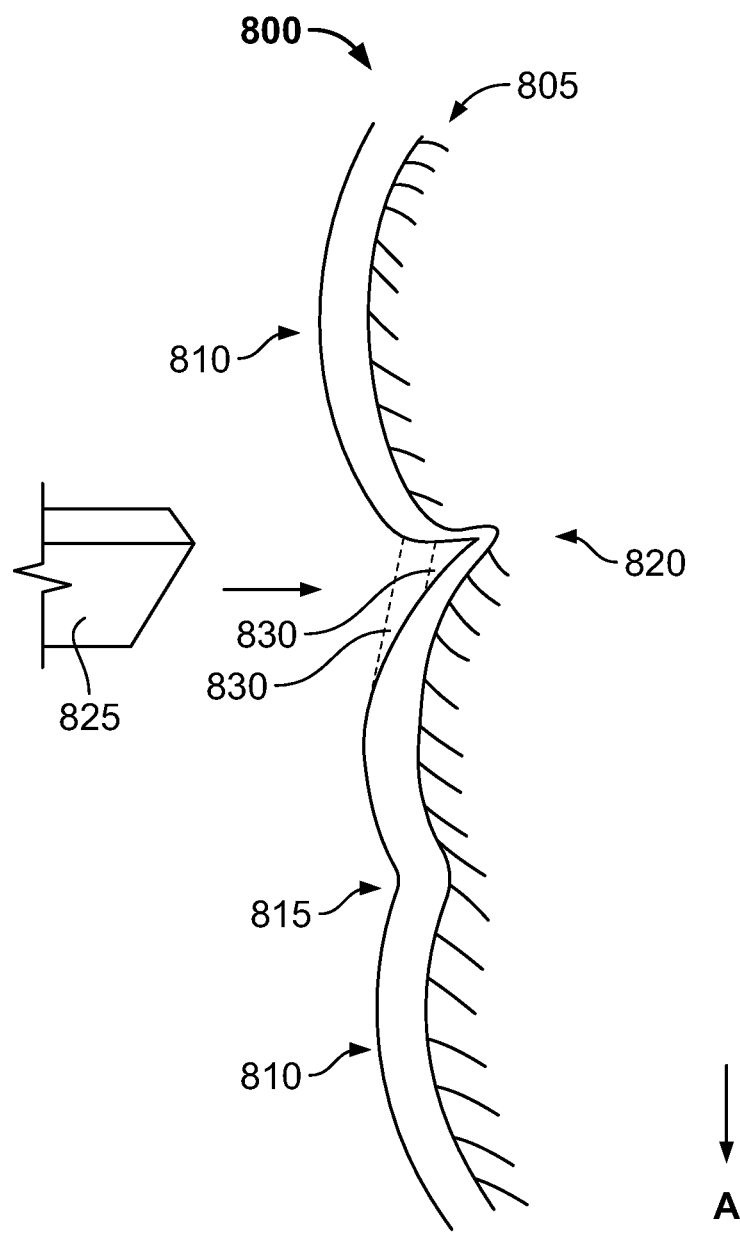
FIG. 10 shows a crimping technique that may be used to any of the crimping embodiments.

FIG. 10 shows another crimping technique that may be used in any of the crimping embodiments. In FIG. 10 a portion of a crimp ring 800, after crimping to a sheath 805, is shown in cross-section. The crimped structure of crimp ring 800 includes a multiple of peaks 810 and valleys 815. In addition, crimped crimp ring 800 includes a recessed portion 820 that is formed by action of a protrusion 825 on the crimp die that is used to crimp the crimp ring 800. Prior to crimping the part of the crimp ring 800 that forms recessed portion 820 conforms to the cylindrical shape of the crimp ring as shown by phantom lines 830. After crimping the recessed portion 820 is formed as a dent extending toward the interior of the crimped crimp ring 800. In this configuration movement of the sheath 805 relative to the crimp ring 800 is resisted by the recessed portion 820 and the valleys 815 when the sheath is pulled in the direction A. The recessed portions 820 and valleys 815 also resist movement when the sheath is pulled in a direction opposite direction A, but to a lesser extent because of the shape of the recessed portion 820.

FIGS. 11A-11F show a tenth embodiment. In the tenth embodiment a tube 900 is placed around a cable 905, the tube having a dimension 950 larger than the dimension 52 of the opening of the stopper wall 45, and the cable having a sheath 910 with a dimension 25 and a multiple of elongated members 915. The sheath 910 is divided, for example split in half along division 920 to separate portions 910a and 910b. Then the portions 910a and 910b of sheath 910 are folded back over tube 900 and a crimp ring 920 is positioned over portions 910a and 910b. When the crimp ring 920 is crimped, it binds portions 910a and 910b to the tube 900. As such, the tube 900 and crimped crimp ring 920 act to prevent sheath 910 from being pulled past stopper wall 45 when a pull-force in direction A acts on sheath 910.

Figure 11A:
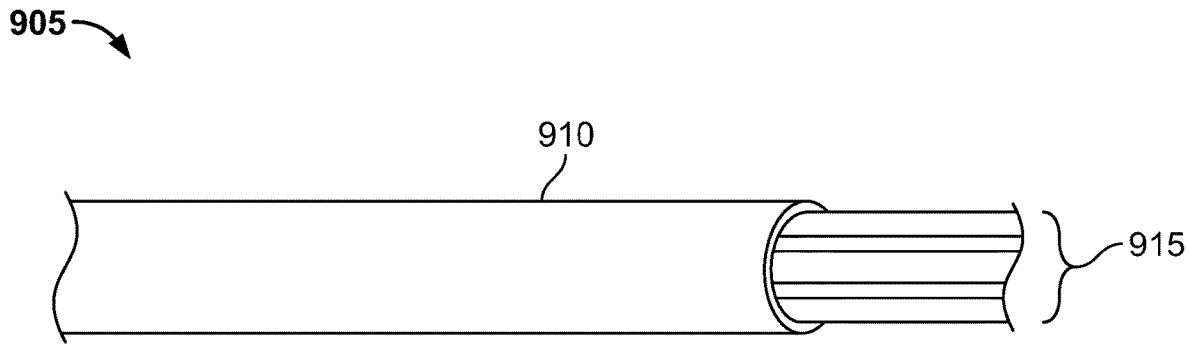
FIGS. 11A-11F show a tenth embodiment.
Figure 11B:
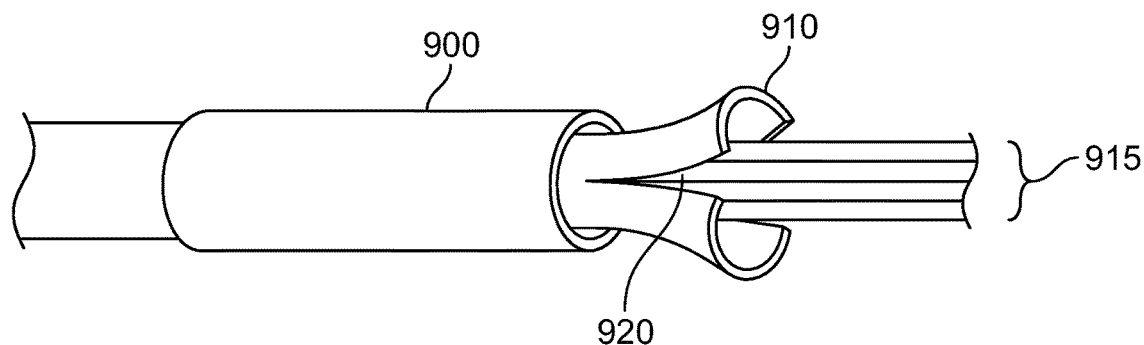
Figure 11C:
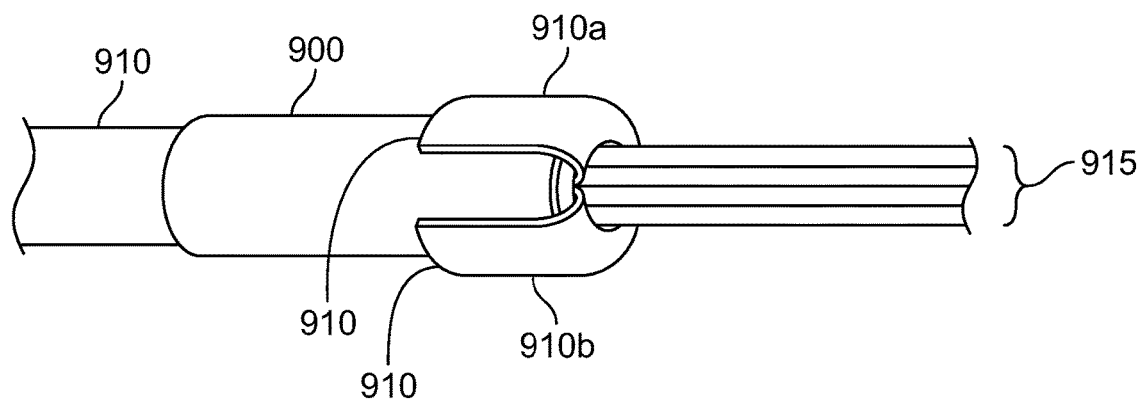
Figure 11D:
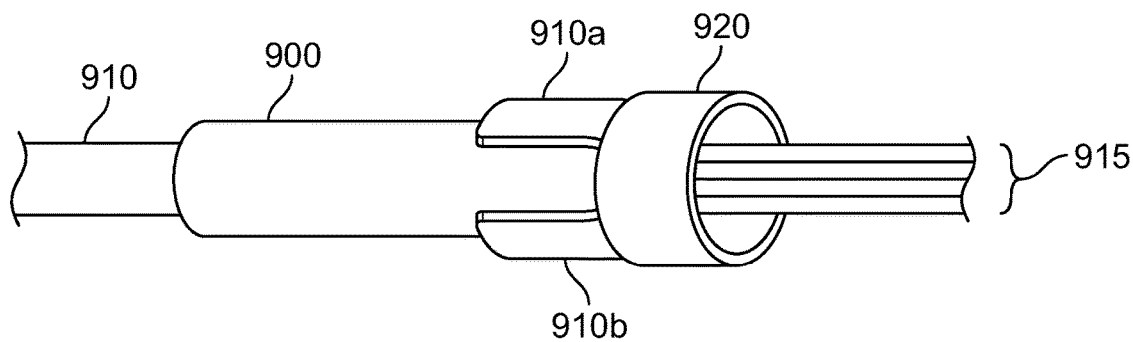
Figure 11E:
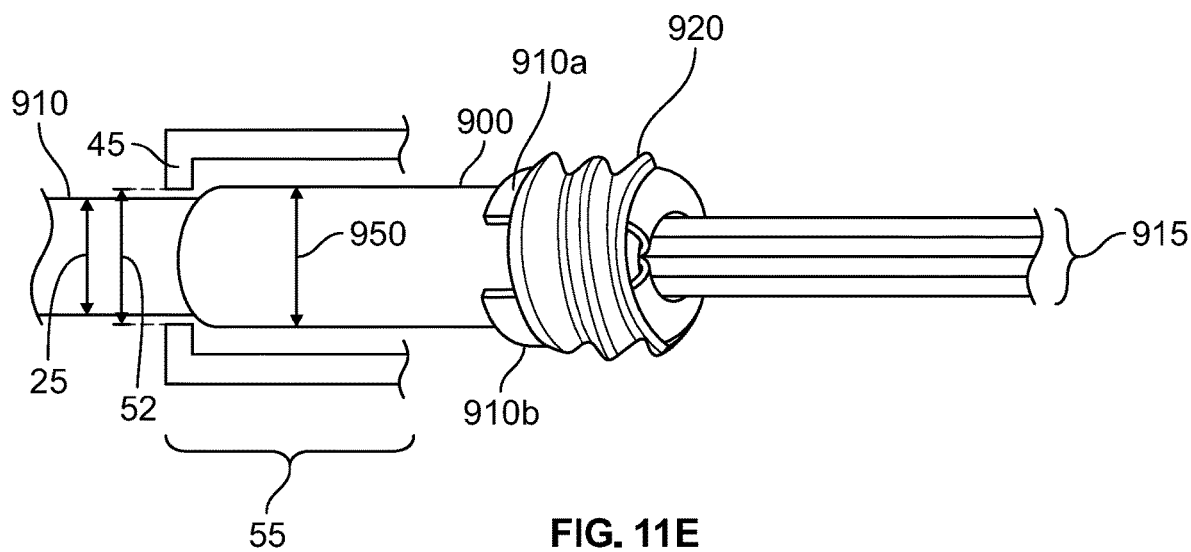
Figure 11F:
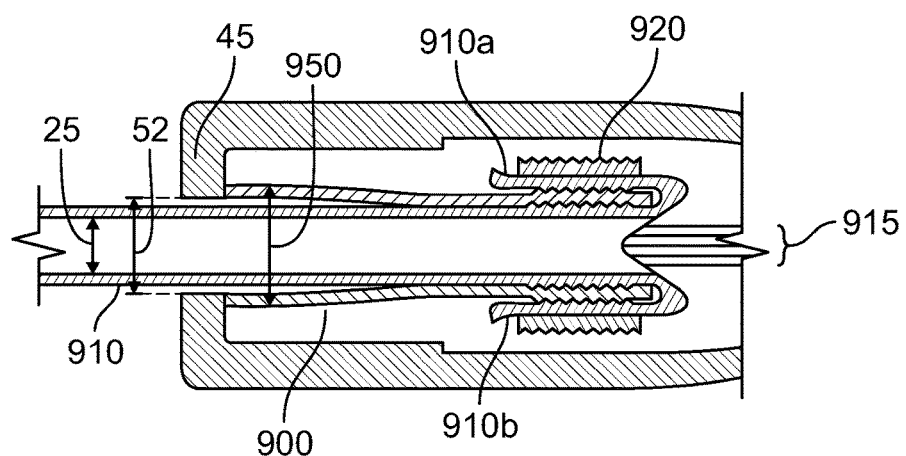
Figure 11G:
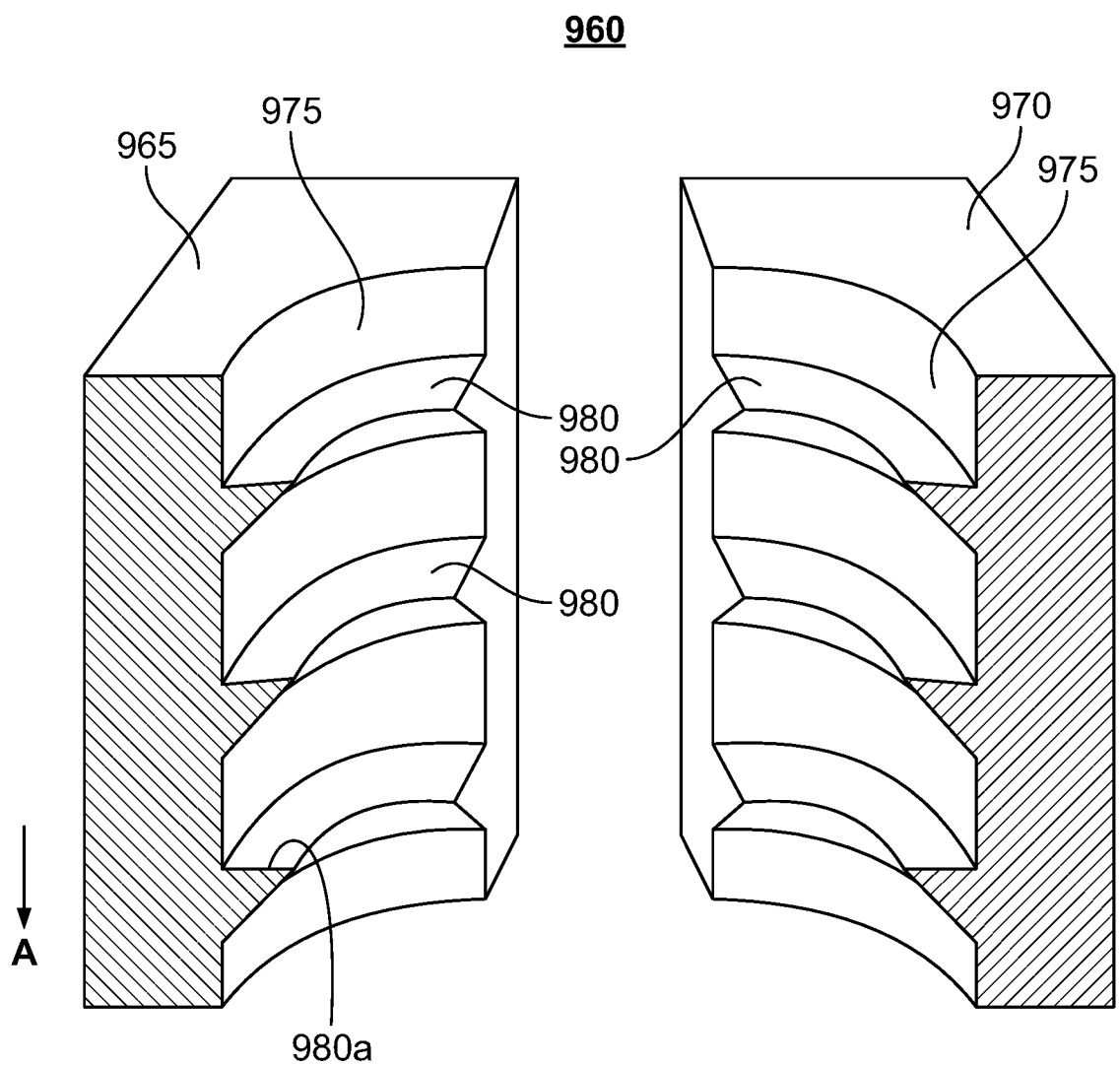
FIG. 11G is a cross-sectional perspective view of another alternative crimp die that may be used according to any of the crimping embodiments.

Regarding FIG. 11E, it should be noted that the shape of the crimped crimp ring 920 may be realized through use of a crimp die having circumferentially continuous protrusions. An example of such a crimp die is shown in FIG. 11G. FIG. 11G is a cross-sectional perspective view of a crimp die 960 formed of two halves 965 and 970. The two halves 965 and 970 considered together have an inner surface 975, with a multiple of parallel rings 980 protruding from the inner surface 975. Each of the rings 980 has a generally triangular cross-section, with one side of each triangular cross-section, for example side 980a, being oriented perpendicular to a direction A. When the crimp die 960 is used to crimp a crimp ring the resulting crimped ring exhibits a pattern reflecting the die, and thus includes, for example, a side corresponding to side 980a. In this manner the resulting crimped ring will provide a high degree of resistance to movement, relative to the crimped ring, of an element held by the crimped ring when the element is acted on by a force in a direction A. The applicability of the crimp die 960 of FIG. 11G to other embodiments of the present technology will be readily apparent in light of this disclosure.

Figure 12A:
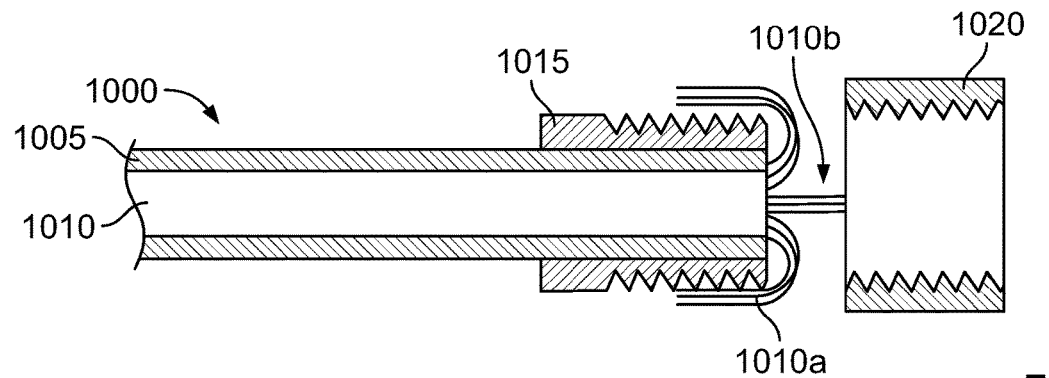
FIGS. 12A-12C show cross-sectional views of an eleventh embodiment.
Figure 12B:
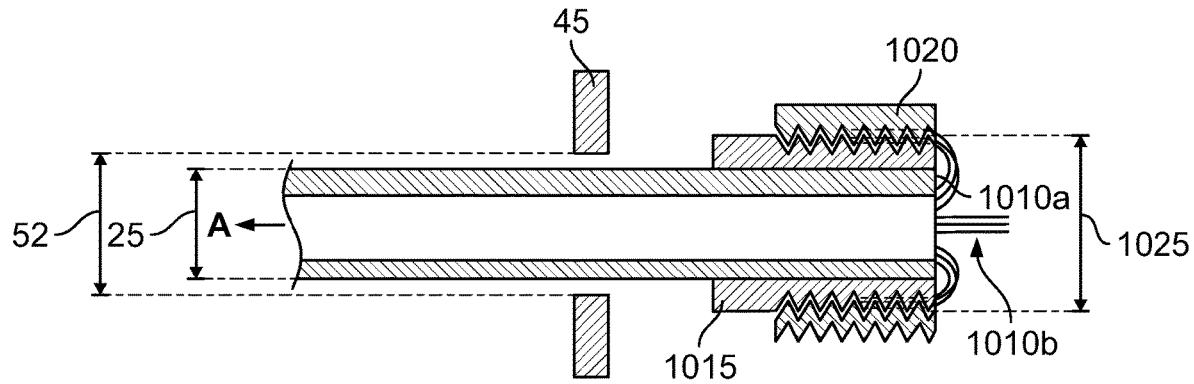
Figure 12C:
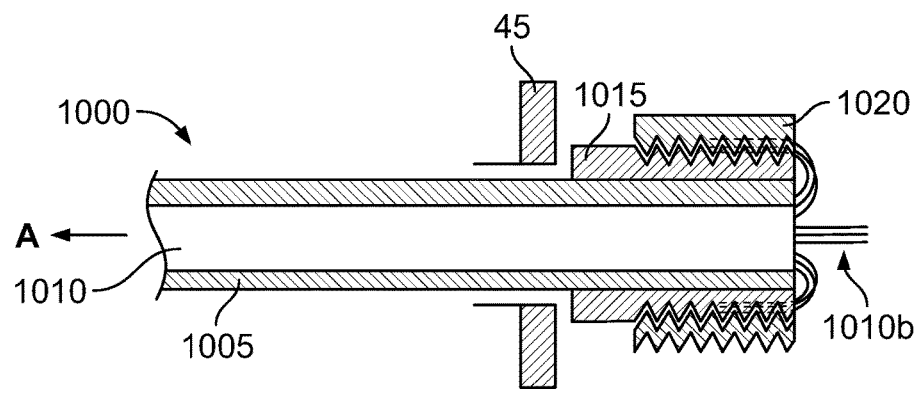

Referring now to FIGS. 12A-12C, there are shown cross-sectional views of an eleventh embodiment. As can be seen from FIGS. 12A-12C, the eleventh embodiment includes a cable 1000 having a sheath 1005 and elongated members 1010, a threaded tube 1015 secured to sheath 1005, and a threaded ring 1020. The elongate members 1010 include strength members 1010a and transmission lines 1010b. The threaded ring 1020 is threadably engaged with the threaded tube 1015 with strength members 1010a positioned between the threaded ring and the threaded tube. The threaded tube 1015 has a dimension 1025 that is larger than the dimension 52 of the opening in the stopper wall 45. Accordingly, the tube 1015 prevents the sheath 1005 from being pulled past the stopper wall 45 when a force is exerted on the sheath 1005 in the direction A. Moreover, the positioning of the strength members 1010a between threaded ring 1020 and tube 1015 secures the strength members 1010a relative to the threaded ring and tube in the event the strength members are not secured to the sheath 1005.

Figure 13A:
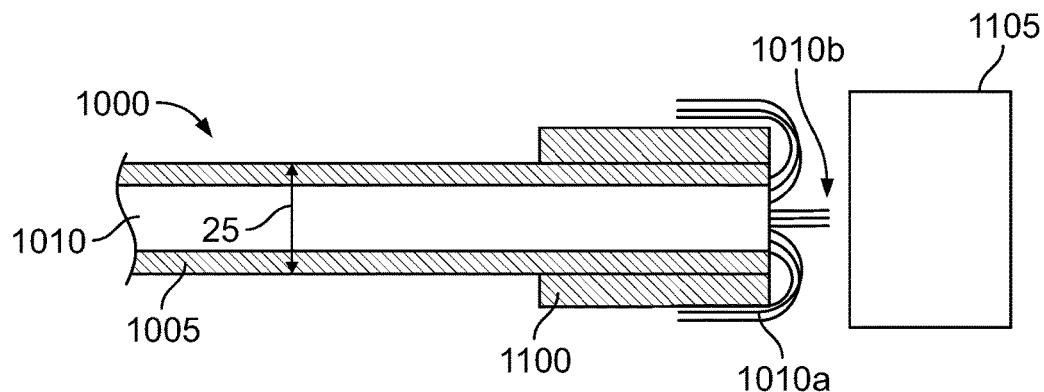
FIGS. 13A-13C show cross-sectional views of a twelfth embodiment.
Figure 13B:
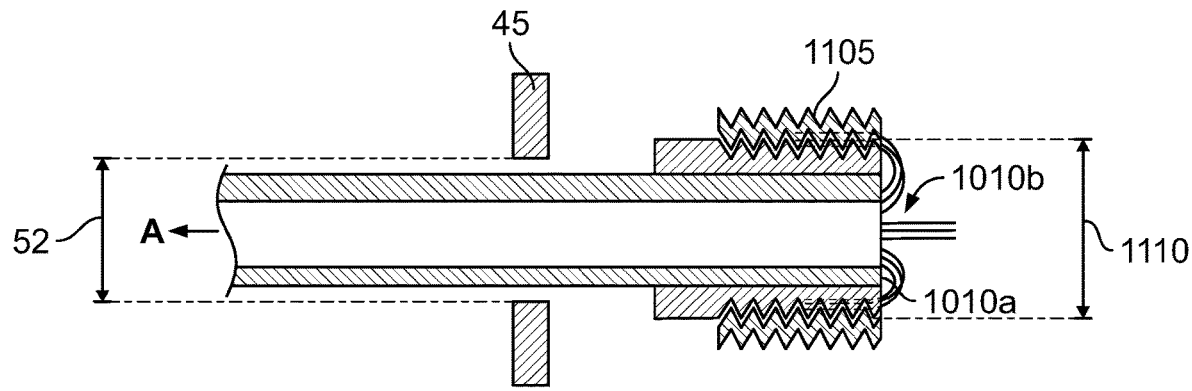
Figure 13C:
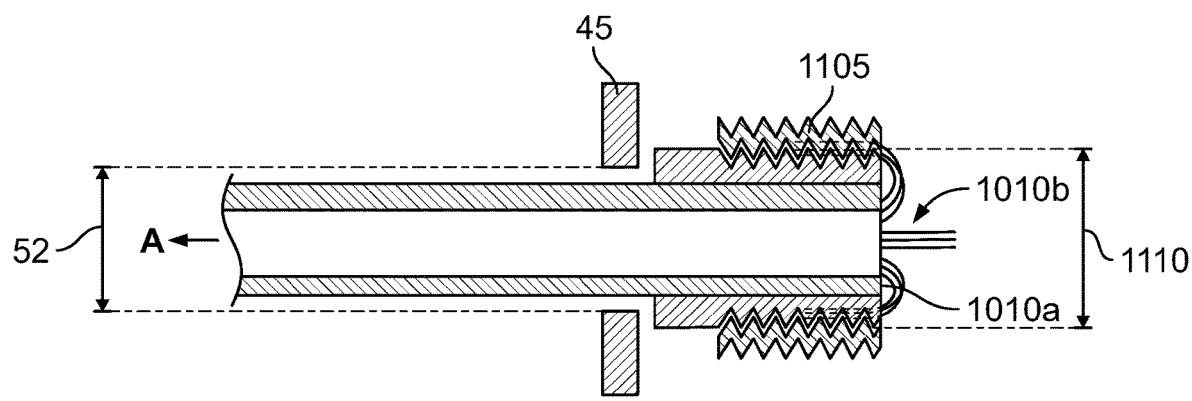

FIGS. 13A-13C show cross-sectional views of a twelfth embodiment. As can be seen from FIGS. 13A-13C, the twelfth embodiment includes cable 1000 having sheath 1005 and elongated members 1010, a tube 1100 secured to sheath 1005, and a crimp ring 1105. The crimp ring 1105 is positioned over tube 1100 and strength members 1010a and then crimped. The resulting structure is shown in FIG. 13B, arranged within stopper wall 45. The tube 1100 has a dimension 1110 that is larger than the dimension 52 of the opening in the stopper wall 45. Accordingly, the tube 1100 prevents the sheath 1005 from being pulled past the stopper wall 45 when a force is exerted on the sheath 1005 in the direction A. Moreover, the positioning of the strength members 1010a between crimped crimp ring 1105 and tube 1100 secures the strength members 1010a relative to the crimped ring and tube in the event the strength members are not secured to the sheath 1005.

Figure 14A:
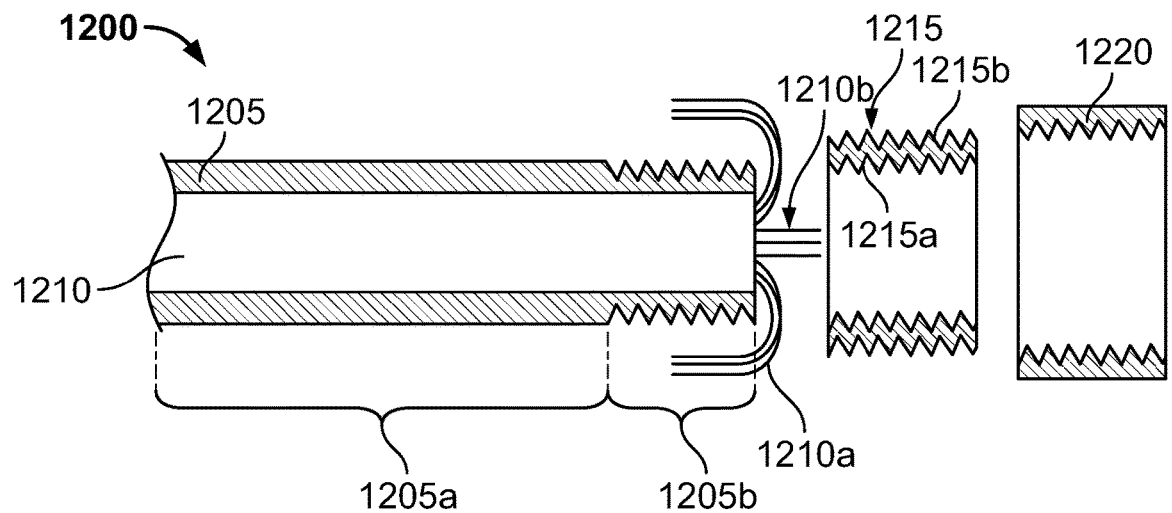
FIGS. 14A-14C show cross-sectional views of a thirteenth embodiment.
Figure 14B:
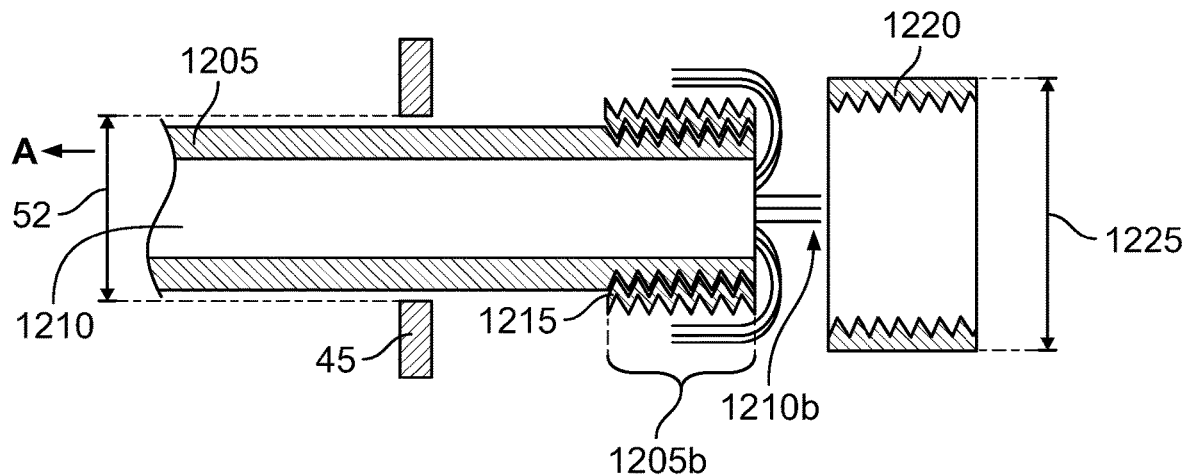
Figure 14C:
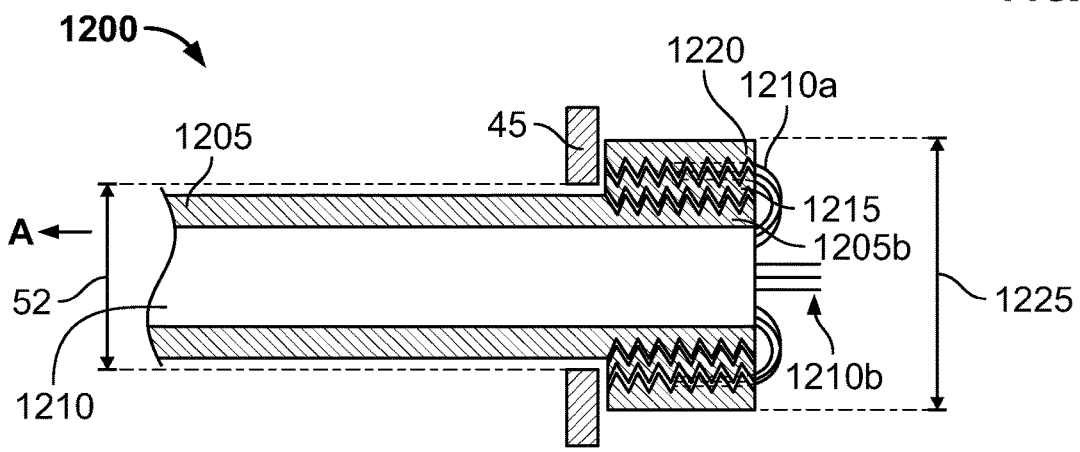

FIGS. 14A-14C show cross-sectional views of a thirteenth embodiment. The embodiment includes a cable 1200 having a sheath 1205 with a non-threaded portion 1205a and a threaded portion 1205b, elongated members 1210 including strength members 1210a and transmission lines 1210b, a dual-threaded ring 1215 having inner threads 1215a and outer threads 1215b, and a threaded ring 1220. The strength members 1210a are positioned inside, or through, the dual-threaded ring 1215 and then the inner threads 1215a of dual threaded ring 1215 are threadably engaged with the threaded portion 1205b of the sheath 1205. The resulting structure is shown in FIG. 14B, in arrangement with stopper wall 45. The threaded ring 1220 is added to the structure of FIG. 14B by positioning the strength members 1210a alongside the outer threads 1215b of the dual-threaded ring and then threadably engaging the threaded ring 1220 with outer threads of the dual-threaded ring 1215. The resulting structure is shown in FIG. 14C, in arrangement with stopper wall 45. The threaded ring 1220 has a dimension 1225 that is larger than the dimension 52 of the opening in the stopper wall 45. Accordingly, the threaded ring 1220 serves as an anchor preventing the sheath 1205 from being pulled past the stopper wall 45 when a force is exerted on the sheath 1205 in the direction A. Moreover, the positioning of the strength members 1010a between the threaded ring 1220 and the dual threaded ring 1215 secures the strength members 1210a relative to the threaded ring 1220 in the event the strength members are not secured to the sheath 1205.

Figure 15A:
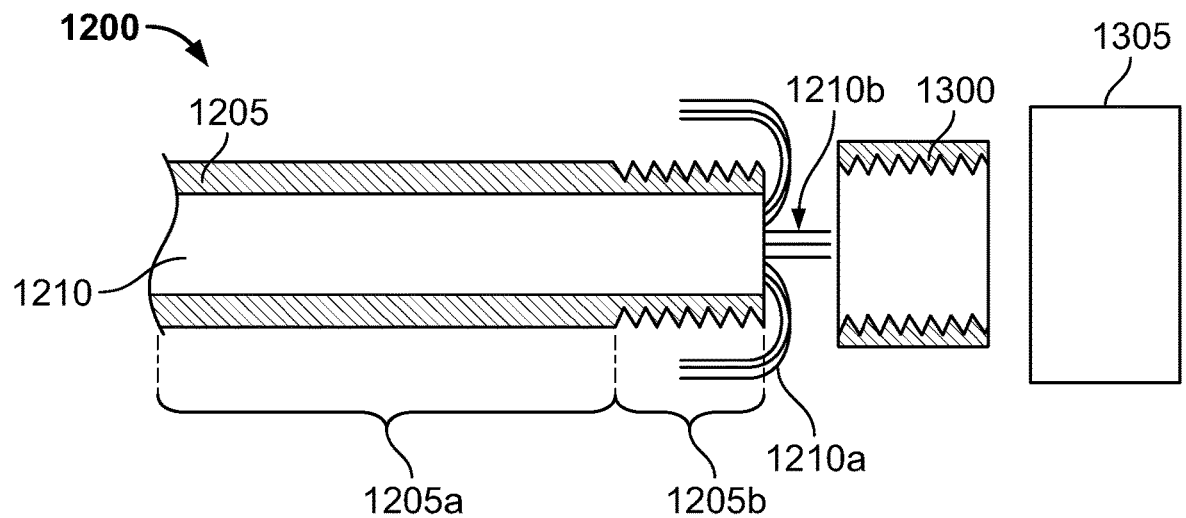
FIGS. 15A-15C show cross-sectional views of a fourteenth embodiment.
Figure 15B:
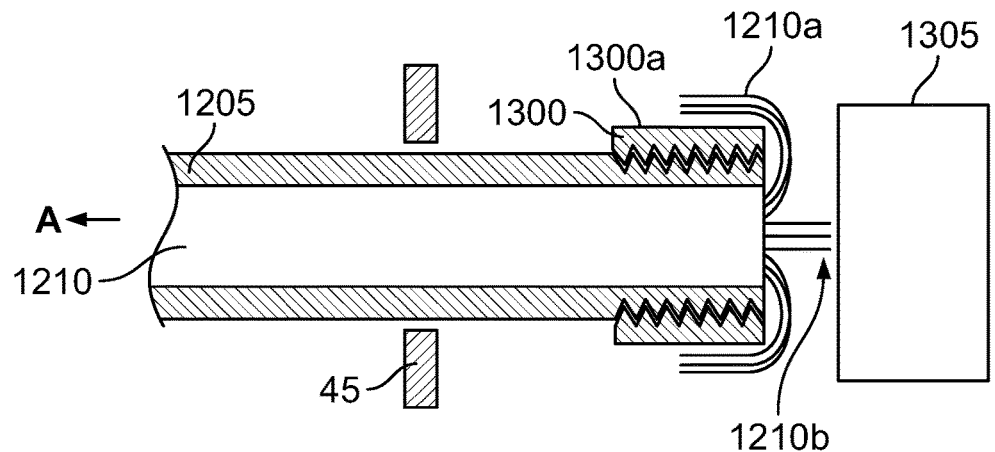
Figure 15C:
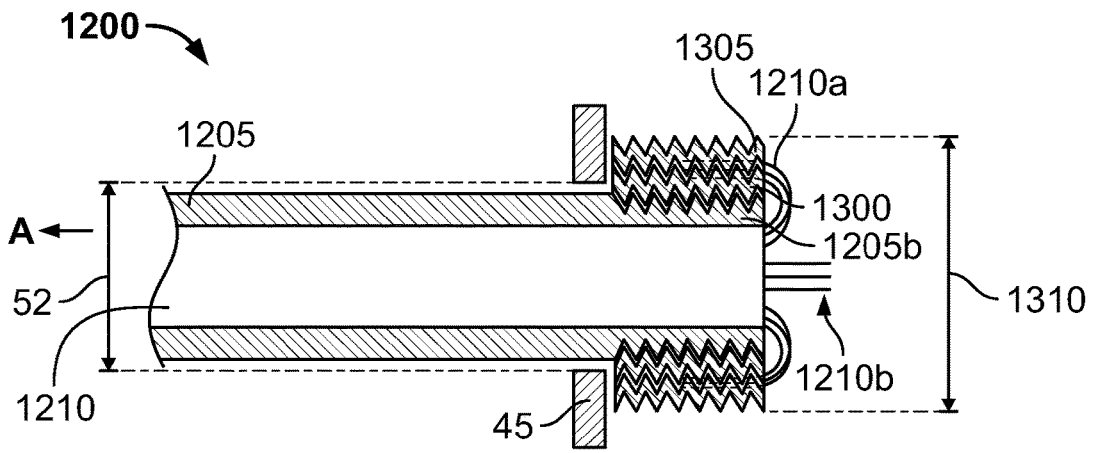

FIGS. 15A-15C show cross-sectional views of a fourteenth embodiment. The embodiment includes cable 1200 having sheath 1205 with non-threaded portion 1205a and threaded portion 1205b, elongated members including strength members 1210a and transmission lines 1210b, a threaded ring 1300, and a crimp ring 1305. The strength members 1210a are positioned inside, or through, the threaded ring 1300 and then the threaded ring is threadably engaged with the threaded portion 1205b of the sheath 1205. The resulting structure is shown in FIG. 15B, in arrangement with stopper wall 45. The crimp ring 1305 is added to the structure of FIG. 15B by positioning the strength members 1210a alongside the threaded ring 1300 outer surface 1300a, positioning the crimp ring 1305 around the strength members and threaded ring, and then crimping the crimp ring. The resulting structure is shown in FIG. 15C, in arrangement with stopper wall 45. The crimped crimp ring 1305 has a dimension 1310 that is larger than the dimension 52 of the opening in the stopper wall 45. Accordingly, the crimped crimp ring 1305 serves as an anchor preventing the sheath 1205 from being pulled past the stopper wall 45 when a force is exerted on the sheath 1205 in the direction A. Also, the positioning of the strength members 1010a between the threaded ring 1300 and the crimped crimp ring 1305 secures the strength members 1210a relative to the crimped crimp ring 1305 in the event the strength members are not secured to the sheath 1205.

FIGS. 16A-16D are cross-sectional perspective views of crimping embodiments that may be used alone or in combination with other crimping embodiments. The embodiments of FIGS. 16A-16D are each configured to prevent pulling of a cable sheath 1305 past a stopper wall when a force in a direction A acts on the sheath. In the FIG. 16A embodiment a crimp ring 1310 is crimped onto the sheath 1305 and the resulting structure is positioned within a stopper wall 1345. The stopper wall 1345 includes a first side 1350, a second side 1355, and an opening 1360 having an inner surface 1360a that runs from the first side 1350 to the second side 1355. The inner surface 1360a is tapered such that the opening 1360 has a dimension 1365 proximate the second side 1355 than is smaller than a dimension 1370 proximate the first side 1350. The dimension 1370 may be larger than a dimension 1375 of the crimped crimp ring 1310 and the dimension 1365 may be smaller than the dimension 1375 of the crimped crimp ring. Thus, when the sheath is forced in direction A the crimped crimp ring 1310 is forced into the opening 1360, past the first side 1350 of the opening but not past the second side 1355 of the opening, and the inner surface 1360a of the opening compresses the crimped crimp ring about the sheath 1305, thereby further securing the sheath within the crimped crimp ring. In this manner, the arrangement of FIG. 16A is highly resistive to movement of the sheath 1305 past the second side 1355 of the opening 1360 when the sheath is acted on by a force in direction A.

In the FIG. 16B embodiment the crimp ring 1310 is crimped onto sheath 1305 and the resulting structure is positioned within a tapered tube 1380 and stopper wall 45.

In the FIG. 16C embodiment a crimp ring 1410 is crimped onto sheath 1305 and the resulting structure is positioned within stopper wall 45. An outer surface of the crimped crimp ring 1410 is tapered.

In the FIG. 16D embodiment crimp ring 1410 is crimped onto sheath 1305 and the resulting structure is positioned within stopper wall 1365.

Most of the foregoing alternative examples are not mutually exclusive, but may be implemented in various combinations to achieve unique advantages. As these and other variations and combinations of the features discussed above may be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings may identify the same or similar elements.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A system comprising:
a sheath having a first end and a second end;
at least one elongated member positioned within the sheath, the at least one elongated member extending at least between the first and the second end of the sheath;
a crimp ring configured to be secured to the sheath, the crimp ring having a first dimension, and the crimp ring including a first plurality of projections on an inner surface of the crimp ring and a second plurality of projections on an outer surface of the crimp ring, the first plurality of projections and the second plurality of projections protruding radially inward when the crimp ring is secured to the sheath, the first plurality of projections being seated in respective deformations on an outer surface of the sheath when the crimp ring is secured to the sheath, and the first plurality of projections, the second plurality of projections, and the deformations being correspondingly formed by crimping of the crimp ring; and
a stopper wall comprising an opening having an opening dimension, the opening dimension being smaller than the first dimension,
wherein the opening is configured to receive the sheath when the crimp ring is secured to the sheath.

2. The system of claim 1, wherein the stopper wall is part of a housing, the housing defining a second opening, the stopper wall being located at an end of the housing, and the second opening having a cross-sectional dimension larger than the opening dimension.

3. The system of claim 2, wherein the second opening is configured to receive the crimp ring.

4. The system of claim 2, wherein the sheath has a sheath diameter, the opening dimension substantially corresponding to the sheath dimeter and the cross-sectional dimension substantially corresponding to the first dimension.

5. The system of claim 2, wherein the second opening is cylindrical.

6. The system of claim 1, wherein the opening dimension is smaller than a maximum diameter of the crimp ring after the crimp ring has been secured to the sheath.

7. The system of claim 1, wherein the at least one elongated member comprises at least one transmission line and at least one strength member.

8. The system of claim 1, wherein the first plurality of projections and the second plurality of projections have a triangular cross-section.

9. The system of claim 1, further comprising a crimp die, the crimp die configured to secure the crimp ring to the at least one end of the sheath.

10. The system of claim 9, wherein the crimp die includes a plurality of protrusions protruding radially inward.

11. The system of claim 1, further comprising a ring configured to be secured to the crimp ring.

12. The system of claim 11, wherein the at least one elongated member comprises at least one transmission line and at least one strength member, the strength member is configured to be crimped between the ring and the crimp ring when the ring is secured to the crimp ring.

13. A system, comprising:
a sheath having a first end and a second end;
at least one elongated member positioned within the sheath, the at least one elongated member extending at least between the first and the second end of the sheath;
an anchor configured to be secured to the sheath, the anchor having a first dimension, and the anchor including a first plurality of projections on an inner surface of the anchor and a second plurality of projections on an outer surface of the anchor, the first plurality of projections and the second plurality of projections protruding radially inward when the anchor is secured to the sheath, the first plurality of projections being seated in respective deformations on an outer surface of the sheath when the anchor is secured to the sheath, and the first plurality of projections, the second plurality of projections, and the deformations being correspondingly formed by compression of the anchor; and
a stopper wall comprising an opening having an opening dimension, the opening dimension being smaller than the first dimension,
wherein the opening is configured to receive the sheath when the anchor is secured to the at least one end of the sheath.

14. The system of claim 13, wherein the stopper wall is part of a housing, the housing defining a second opening, the stopper wall being located at an end of the housing, and the second opening having a cross-sectional dimension larger than the opening dimension.

15. The system of claim 14, wherein the second opening is configured to receive the anchor.

16. The system of claim 14, wherein the sheath has a sheath diameter, the opening dimension substantially corresponding to the sheath dimeter and the dimension of the cross-sectional dimension substantially corresponding to the first dimension.

17. The system of claim 13, wherein the anchor is a crimp ring.

18. The system of claim 13, wherein the opening has another opening dimension, the another opening dimension being larger than the first dimension, and the opening being tapered from the another opening dimension to the opening dimension.

19. The system of claim 13, further comprising a tapered tube configured to receive the sheath when the anchor is secured to the at least one end of the sheath, and wherein the opening is configured to receive the tapered tube with the sheath and anchor.

* * * * *